Nov. 10, 1964  G. A. OLOFSSON ET AL  3,156,311
WEIGHING MACHINE

Filed Oct. 17, 1962  16 Sheets-Sheet 1

INVENTORS
GUSTAV A. OLOFSSON
DONALD W. GARNETT
BY
ATTORNEYS

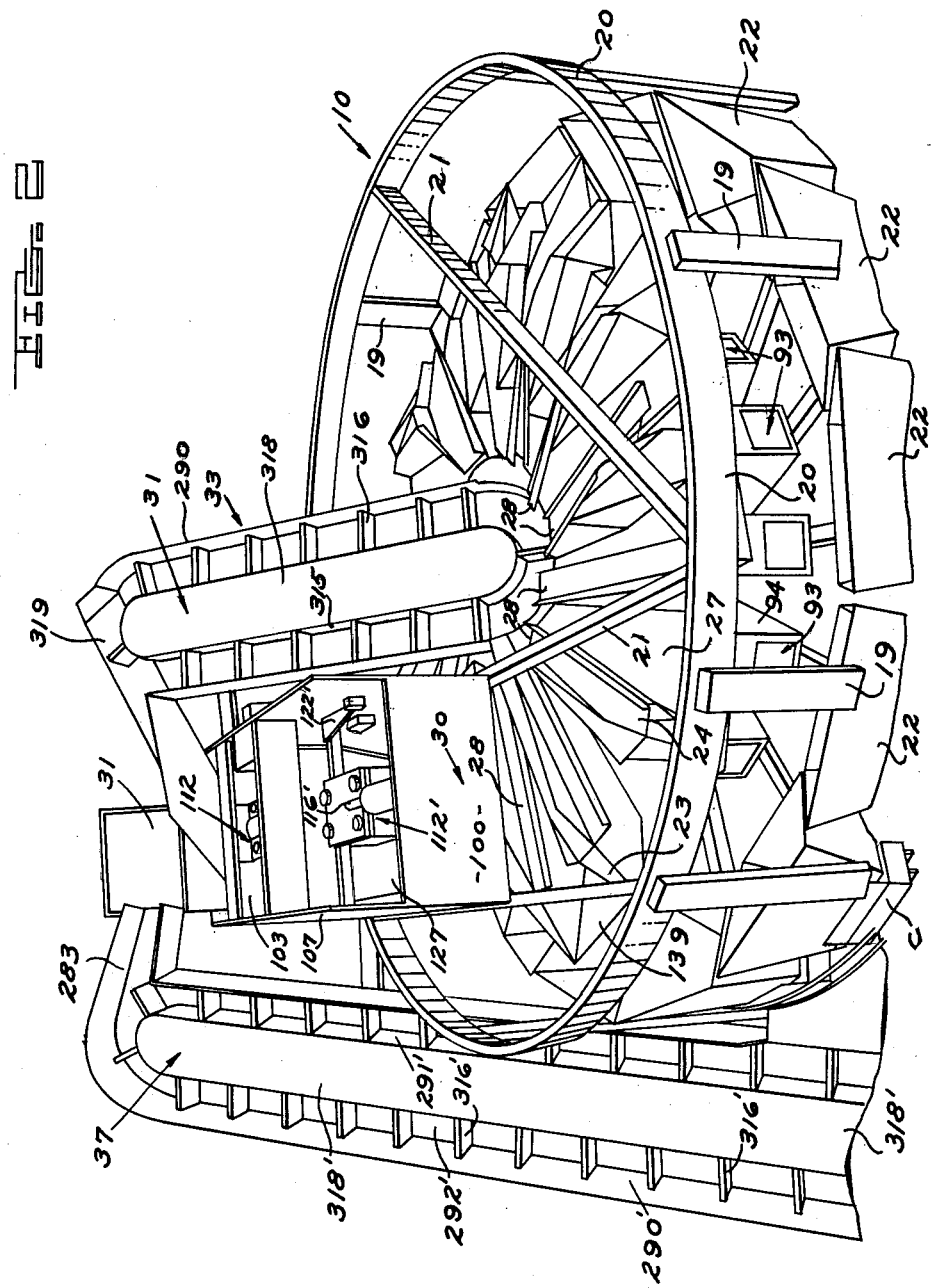

Nov. 10, 1964 G. A. OLOFSSON ET AL 3,156,311
WEIGHING MACHINE
Filed Oct. 17, 1962 16 Sheets-Sheet 3
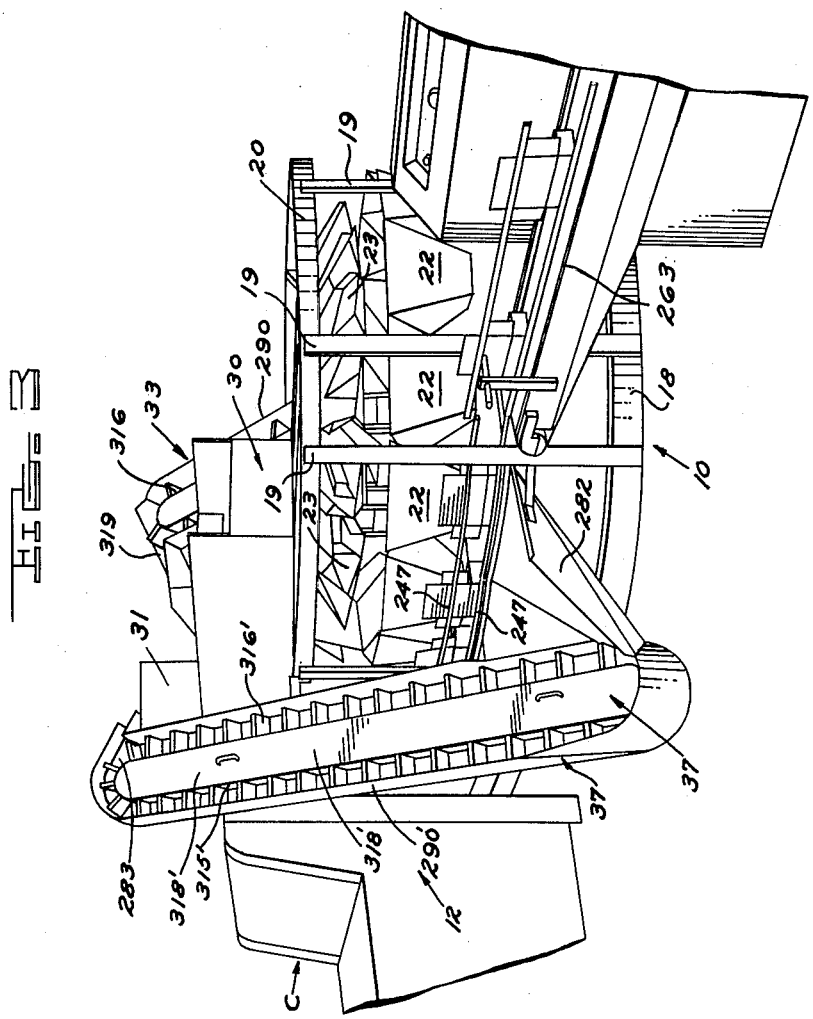
INVENTORS
GUSTAV A. OLOFSSON
DONALD W. GARNETT
BY Whittemore, Hulbert
Belknap
ATTORNEYS

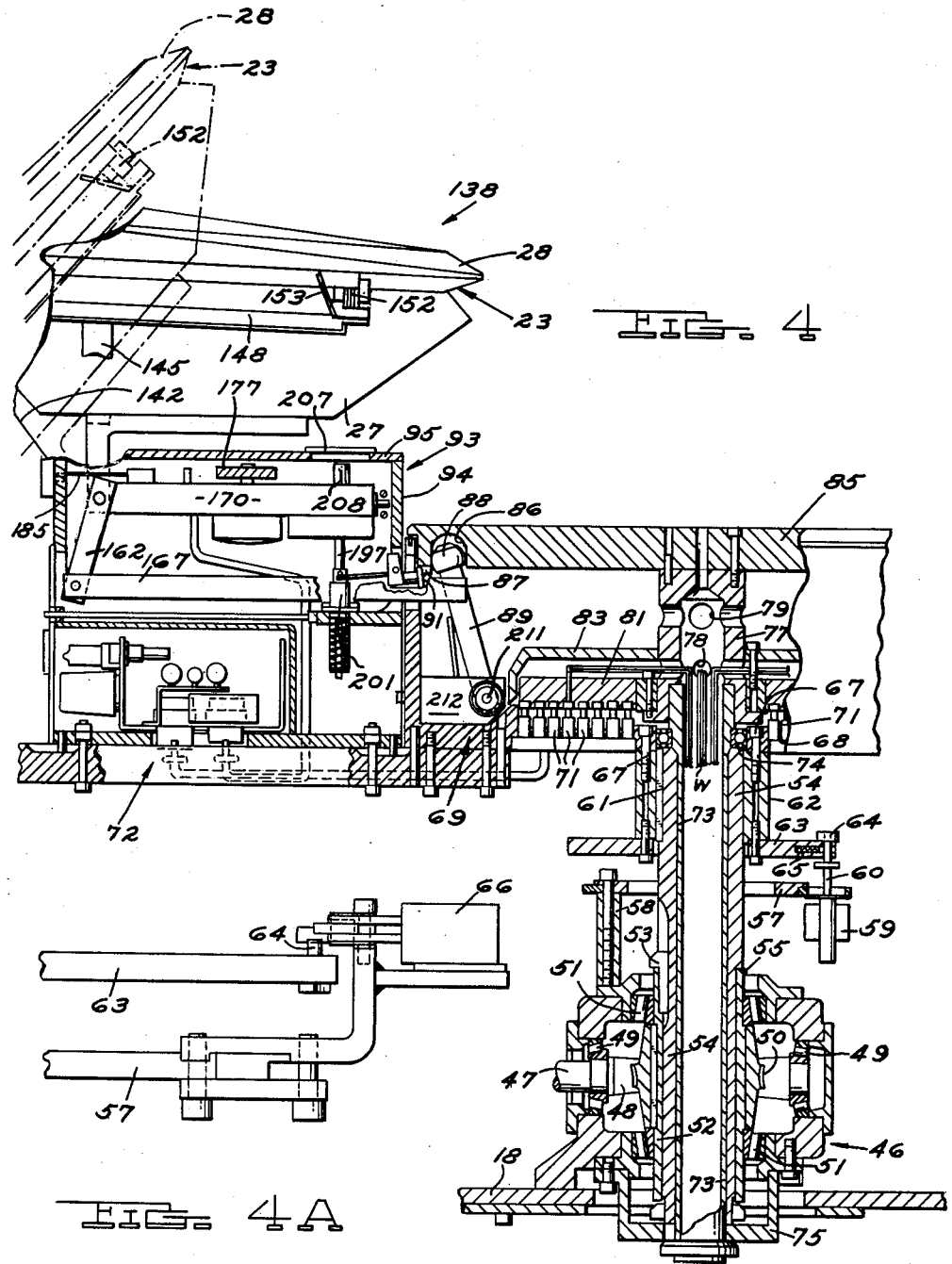

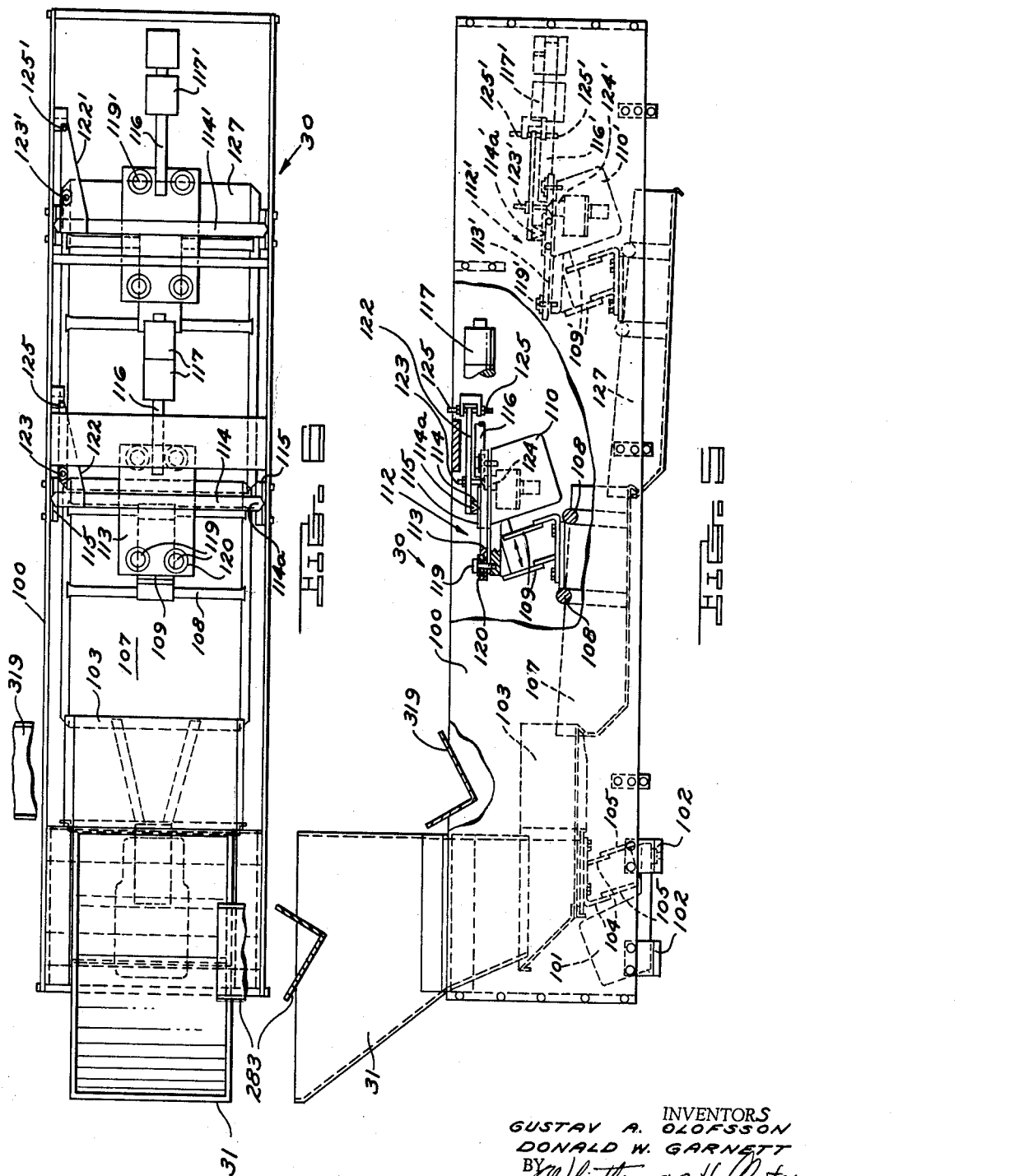

Nov. 10, 1964     G. A. OLOFSSON ET AL     3,156,311
WEIGHING MACHINE

Filed Oct. 17, 1962     16 Sheets-Sheet 6

INVENTORS
GUSTAV A. OLOFSSON
DONALD W. GARNETT
BY Whittemore, Hulbert
Belknap
ATTORNEYS Nov. 10, 1964     G. A. OLOFSSON ET AL     3,156,311
WEIGHING MACHINE Filed Oct. 17, 1962                                                     16 Sheets-Sheet 9

INVENTORS
GUSTAV A. OLOFSSON
DONALD W. GARNETT
BY
ATTORNEYS

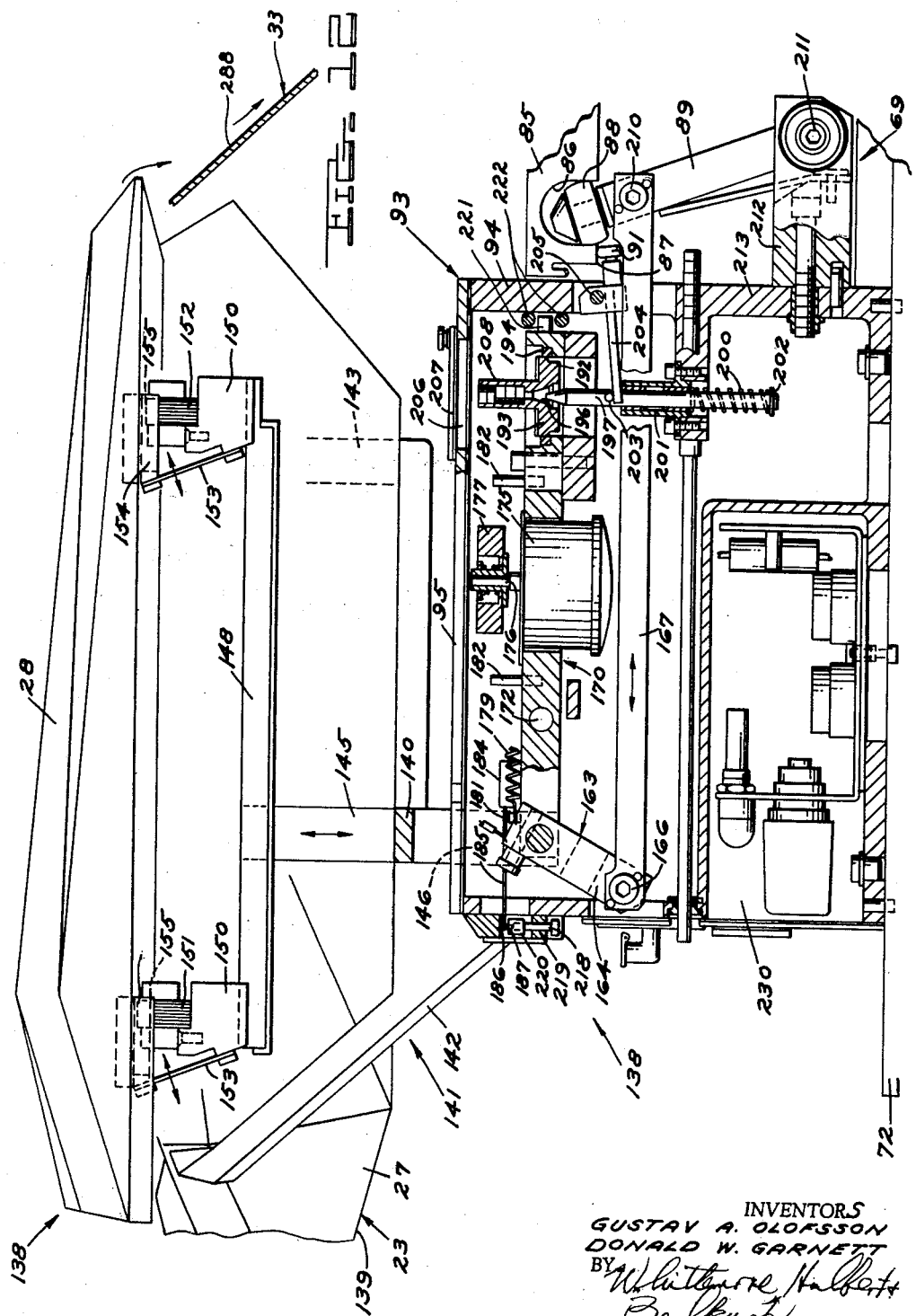

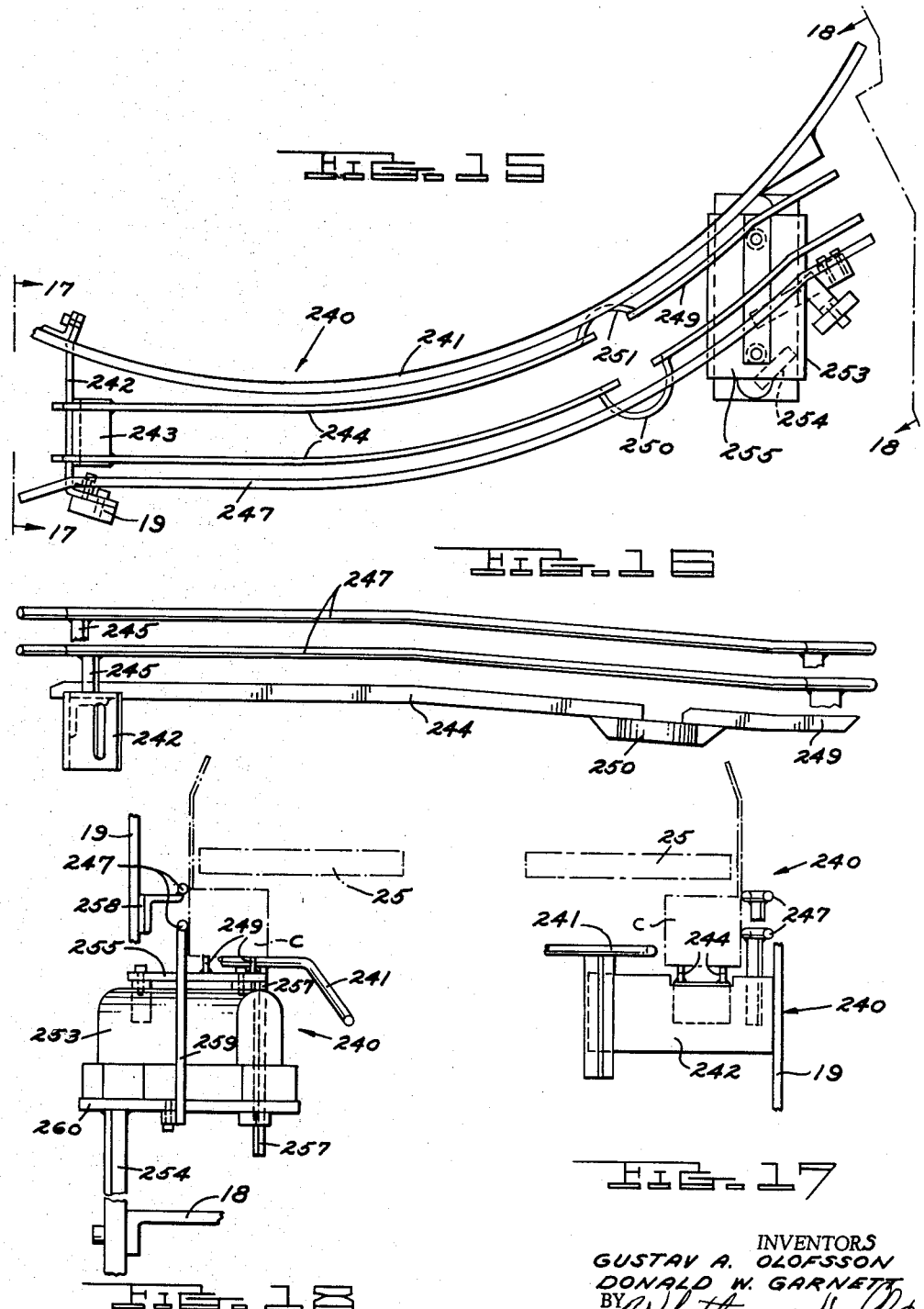

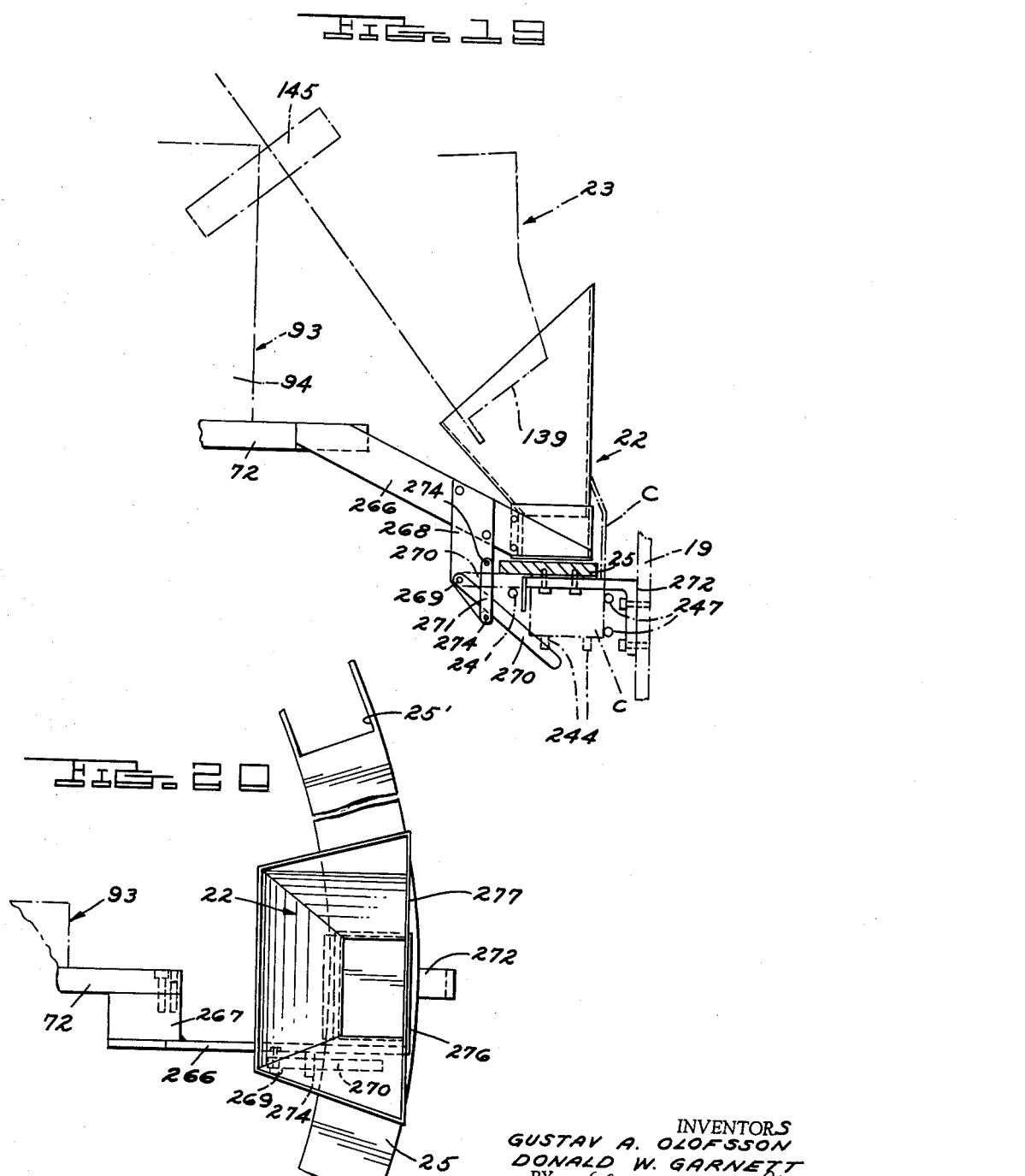

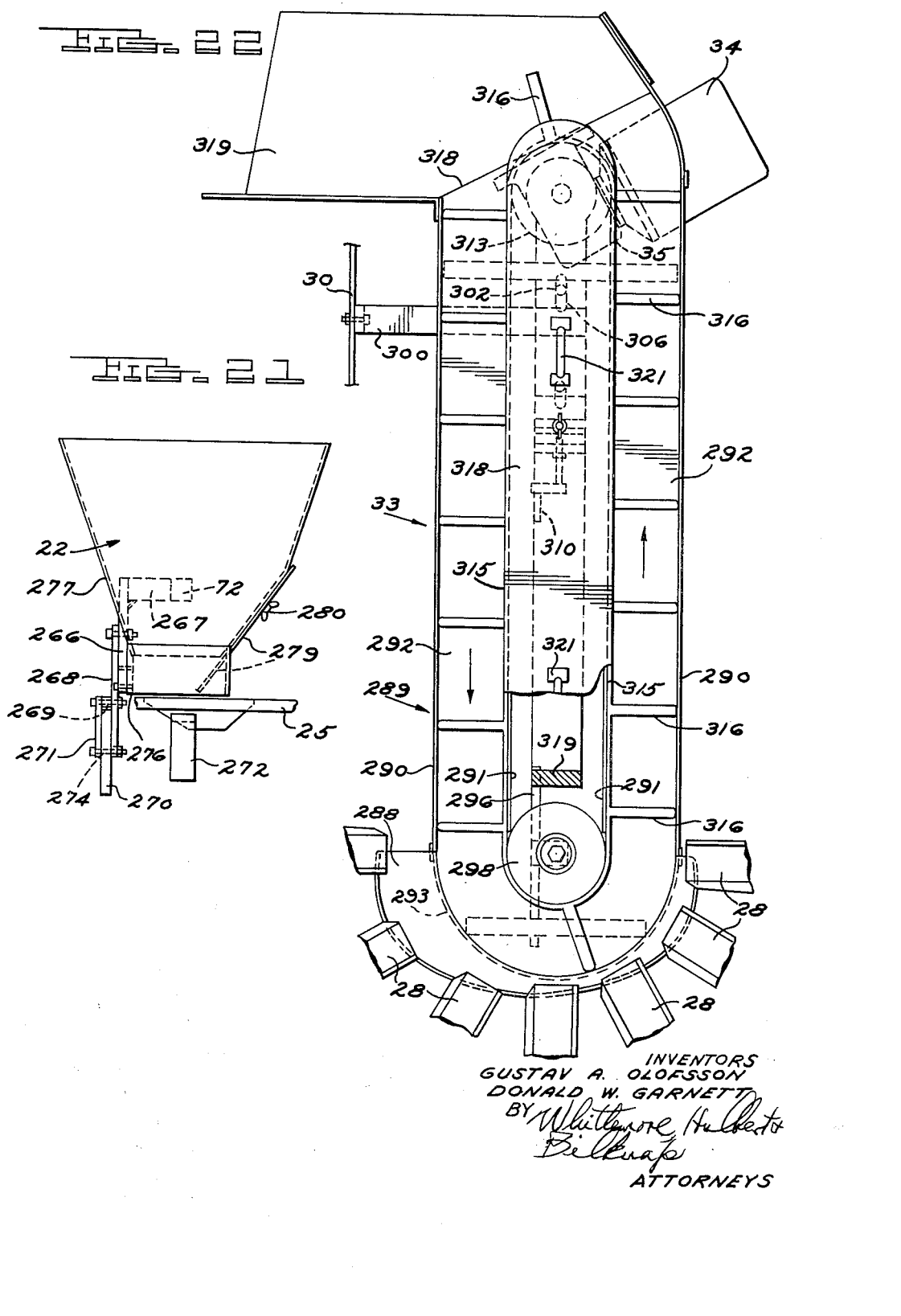

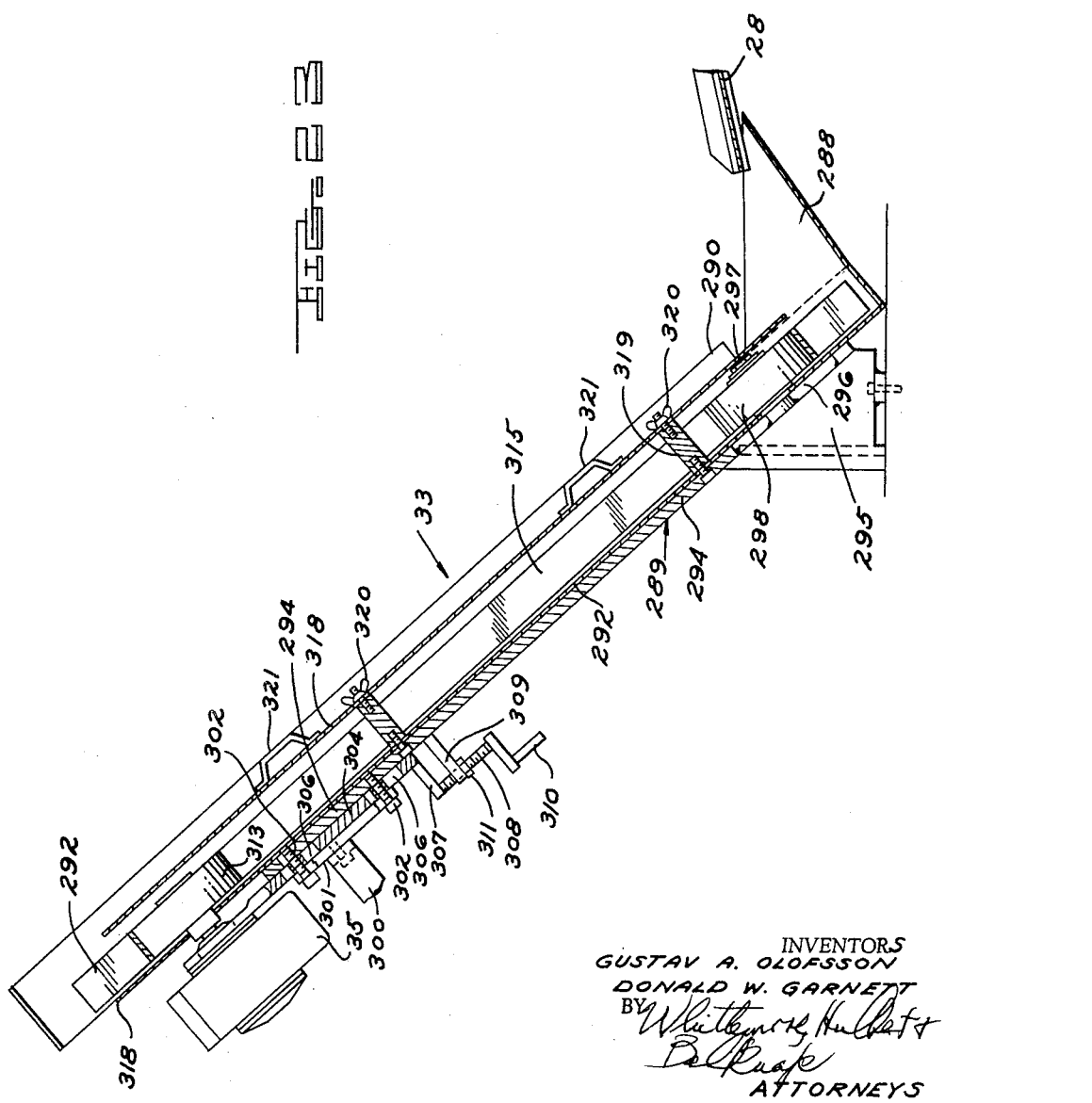

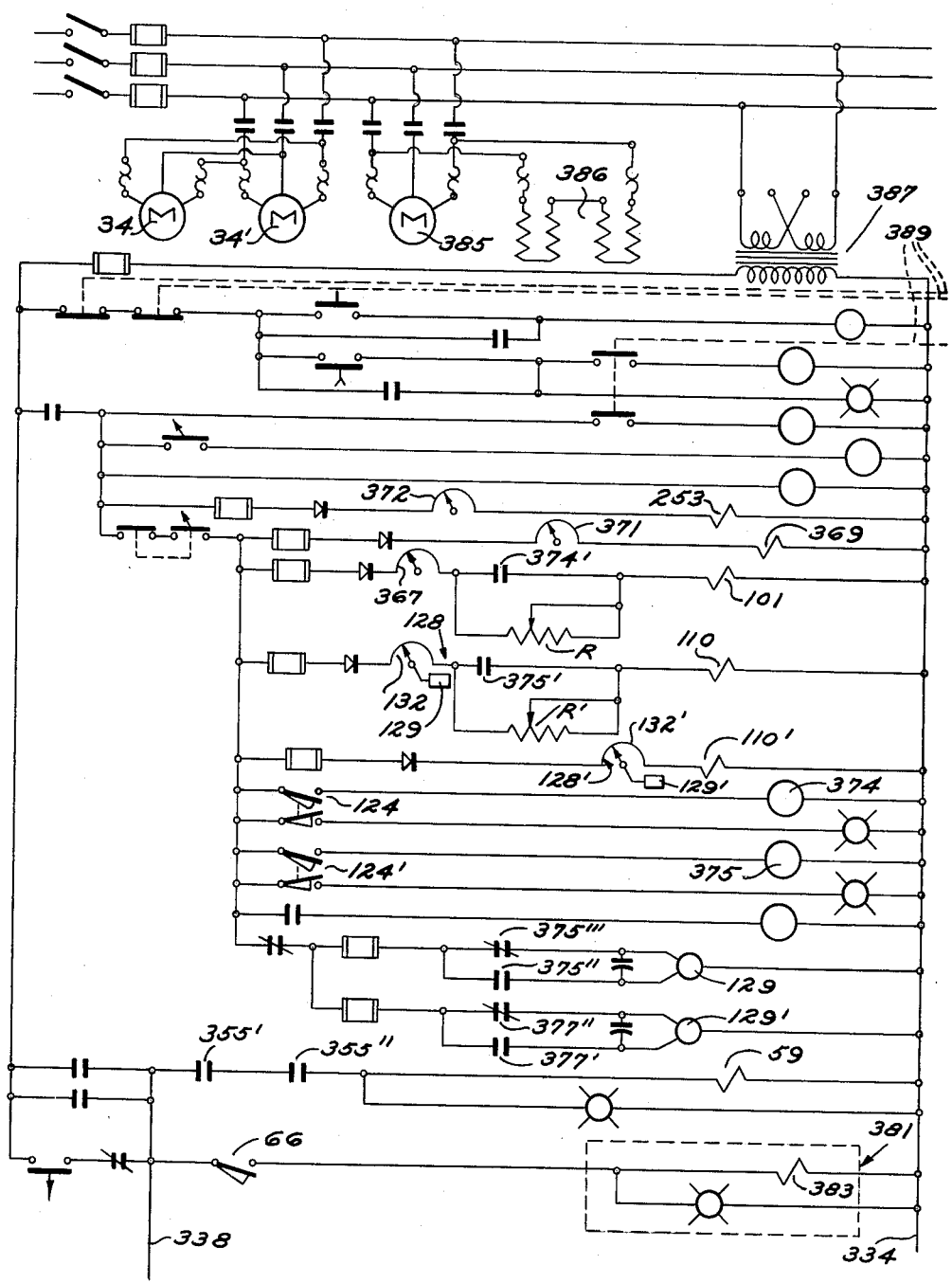

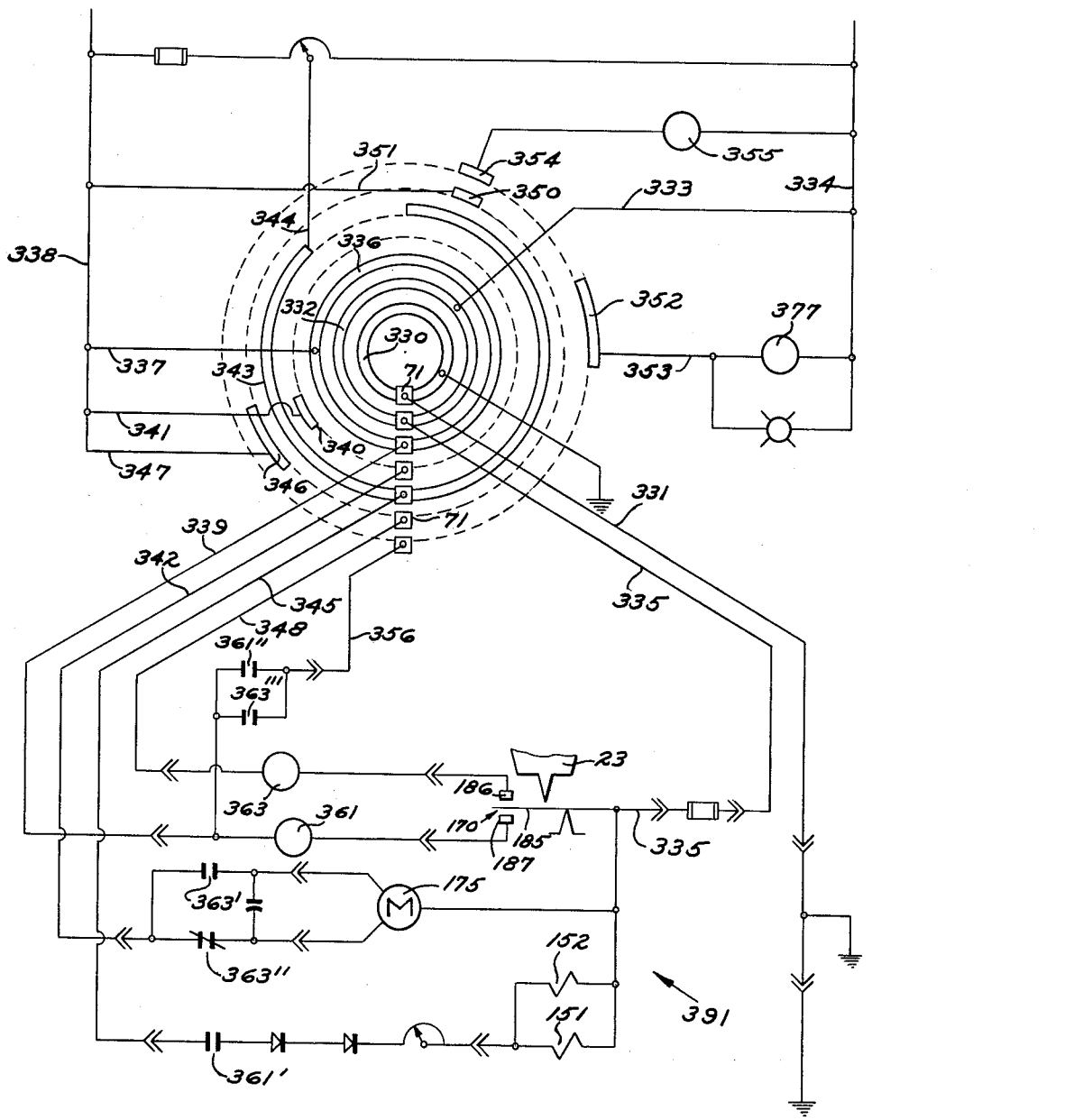

3,156,311
WEIGHING MACHINE
Gustav A. Olofsson, Lansing, and Donald W. Garnett, Grand Ledge, Mich., assignors to The Olofsson Corporation, Lansing, Mich., a corporation of Michigan
Filed Oct. 17, 1962, Ser. No. 231,262
42 Claims. (Cl. 177—55)

The present invention relates to improvements in apparatus for the weighing of discrete materials which is of the general type illustrated and described in the copending application of Garnett and Olofsson, Serial No. 823,385, filed June 29, 1959, now Letters Patent No. 3,094,182, of June 18, 1963. That is, the present apparatus or machine is characterized by a series of dual-type weighing receptacles which are propelled in an endless circular path past a material supply zone at which the receptacle receives from a suitable source a charge of material to be weighed, and a dump or discharge zone in which the accurately weighed content of the receptacle is discharged, for example to packaging equipment or containers in which the material is to be vended.

An essential feature of the subject apparatus, like that disclosed in the Garnett et al. application, is that the receptacles in question each comprise a relatively large capacity receptacle member or pan, by which a major portion of the receptacle charge is received from the supply source, and a relatively small capacity receptacle member or tray simultaneously receiving a relatively slight portion of the initial charge. The combined content of the two receptacle parts represents an overweight, exceeding the desired weight value to be packaged; and during the travel of the composite receptacle from supply to discharge zones the smaller tray is vibrated to cause a dribble of material in a relatively small stream from this pan, until the receptacle content drops in weight to the desired value, whereupon vibration ceases and the receptacle is dumped at the discharge zone later.

It is of course important that, as thus discharged, the material shall neither significantly fall short of or exceed a desired accurate weight, for in the latter case there results a substantial loss in terms of packaged product, and in the former case the legal liability of short weighing may arise. It commonly, in fact usually, happens, particularly in the weighing of greasy or salty material, or those coated with a flavoring agent of one sort or another, that such materials adhere to the walls of the weighing receptacle, occasioning a build-up and retention of weight thereon which, after a number of weighing cycles of the receptacle, will seriously diminish the true weight of the receptacle content which is actually discharged at the dump zone. That is, the scale means by which the receptacle is supported and weighed during its travel and dribble feed-off does not accurately reflect the weight of the dischargeable receptacle content, so that underweighing will take place. It would of course be possible to compensate for the discrepancy represented by substance adhering to the receptacle wall by charging the receptacle with a sufficient overweight, but this is of course economically unsound.

It is therefore a general object of the invention to provide an improved automatic weighing machine, continuous in operation, in which provisions of a novel sort are made to periodically zero-out each receptacle's weighing scale beam means, preferably upon the completion of each rotary cycle of weighing and discharging, so that the disturbing effect of salt, grease or other coating agent adhering to the receptacle wall will be automatically compensated or negated periodically.

More specifically, each traveling receptacle, as balanced on its individual scale beam on the basis of its empty weight, has its scale beam provided with a master weight whose counterpoise effect exactly offsets that of the minimum accurately weighted and discharged content of the receptacle, in the usual manner. However, provision is made, preferably once in each cycle of rotary travel to lift this master weight from the scale beam after the receptacle has been discharged of its weighed content or product. Should there be no appreciable deposit of adhered coating or like agent upon the receptacle at this time, the receptacle of course remains properly balanced, as originally, upon the scale beam. However, in the event such adhered or deposited material is present, increasing even minutely the gross weight of the empty receptacle, provision is made wereby the resultantly unbalanced scale initiates a signal, as by closing an electrical circuit; and means on the scale beam instantaneously responsive to such signal is effective to correct the balance of the beam and receptacle supported thereon, by applying to the scale beam a slightly additional counterpoise effect in opposition to that exerted by the adhered or deposited agent. All of this is accomplished after the receptacle has been dumped at the discharge zone. Thus, the scale unit is zeroed out prior to the receptacle's arriving at the zone at which it receives a next overweight charge from the supply source.

The same circuitry is involved in the operation of checkweighing for underweight as in the operation of zeroing; and the provisions mentioned above enable the scale beam to re-zero to compensate for other conditions that might affect its accuracy, such as spring variation due to aging fatigue or temperature change, change in contact resistance and change in relay sensitivity.

More specifically, the compensation of the scale beam in zeroing out the same in the manner described is performed by an eccentric weight driven by a small electric motor, this eccentric weight being mounted directly upon the scale beam and its drive motor being responsive to the electrical signal originated by the scale beam under the circumstances described so as to shift the weight slightly in a direction to act as an additional component of counterbalance on the beam compensating for the additional weight of substance, grease, salt or flavoring agent, adhering to the receptacle after its discharge. Upon periodic cleaning of the receptacle to remove such adhered substance, the action of the signaling and motor driven counterweight provisions on the scale beam is in the opposite direction to again restore the scale beam to balanced condition, this correction again being performed with the scale beam unaffected by the master weight.

The invention also involves the provision of a self-zeroing scale beam unit, per se, of the character mentioned above; and more particularly one in which all scale beam and control components of the latter are efficiently housed within a sealed housing structure.

Another object of the invention is to provide weighting apparatus in which, during each rotative cycle of each traveling weighing receptacle, and also prior to the receptacle's reaching its dump zone, the receptacle and its content are subjected to a check weighing, with the result that in the event of either an objectionable overweight or underweight a signal will be originated, in response to which the machine is renderd ineffective to discharge the weighed product to a package.

It is a general object of the invention to operate the weighing machine in conjunction with a carton set-up machine of known type supplying erected cartons to the weighing machine in timed relation to the operation of the latter, for example and if desired, through a coordinated drive of one machine from the other. Thus, in accordance with a more specific aspect of the overweight-underweight check and signaling provisions referred to, the signal in question is originated by the scale beam structure of a receptacle unit, and this signal is translated to the carton set-up machine for the purpose of causing the latter to fail to present a set-up carton at the discharge or dump zone of the weighing machine coordinately with the arrival at that zone of the overweight or underweight receptacle.

Accordingly, the incorrectly weighed receptacle content or product is not packaged, but is instead gravitationally received and conveyed for return to an overhead supply bin or hopper which is the original, and thus replenished, source of supply of material to the weighing receptacle means of the machine. In specific accordance with the invention, each weighing receptacle has associated and traveling therewith a funnel into which the receptacle discharges after check weighing and well prior to arrival at the dump zone of the machine. As thus supplied with the weighed receptacle content, the funnel has its open lower end closed, in traveling to the dump zone, by a fixed "dead" rail upon which it slides; and at the dump zone the "dead" rail is provided with an opening through which the weighed funnel content garvitates. This is either to a set-up carton therebeneath in the event the weight of the content is proper and accurate, or to a dump return conveyor as mentioned above in the event the content is overweight or underweight.

Yet another object of the invention is to provide a vibratory feed-off weighing machine, as described, in which the weighing receptacles receive an initial overweight charge in each cycle of rotation thereof from a hopper fed vibratory supply device of improved construction. It is the function and action of this supply device to insure a smooth, metered feed of the material to be weighed to each receptacle in a manner such that the latter will in the vast majority of instances not be found to be underweight or excessively overweight during an interim period of the receptacle weighing cycle in which the receptacle, while being weighed, has its feed-off tray vibrating and thereby diminishing the weight of receptacle content toward an acceptacle value.

In accordance with this object, the vibratory supply device in question is of a cascaded trough type, featuring a series of successive overlapped troughs receiving material from the overhead hopper and each provided with means to vibrate it for a discharge onto a succeeding trough therebeneath, or in the event of the final trough of the series, onto a receptacle traveling therebeneath. Provision is made for the vibration of these troughs at varying intensity, with the result that there is a graduated feed-off from one to another, and the progressive leveling and making uniform of the density of the product being fed off ultimately.

In further accordance with this aspect of the invention, the intensity or rate of vibratory action on at least one feed-off supply trough is controlled in response to the weight of content of a trough onto which it discharges, so that an underweight on a given trough results in a vibratory intensification of the trough feeding to it, or a reduction of the intensity in the event of an overweight indication. A similar signal is transmitted to the final vibratory feed-off trough of the supply device, shown as embodying three cascaded troughs, from the weighed receptacle itself. This signal is originated about half way through the receptacle vibratory phase, so that the supply device as a whole is continually kept properly adjusted in respect to the density in which it feeds the receptacles traveling therebeneath.

A further object of the invention is to provide receptacle supply means of the cascaded trough type described, in which the last two of the three vibratory troughs are balanced ones and originate signals indicative of an underweight or overweight thereon, which automatically adjust arbitrarily the rate of feed of the trough feeding it to increase or dimnish ther ate of feed of said feeding trough. In addition to its thus arbitrarily adjusting the intensity of vibration of the trough feeding off to the same ("low" or "high"), the second trough also has in its electrical circuit means to adjust the overall range of vibrational rate at which it may operate. This involves the use of servo motor-driven rheostat in said circuit which, say, if an adjustment is made from "low" to "high," will simultaneously elevate both the lower and upper limits of the vibratory action, and vice versa. The result is that a "low" to "high" correction of the trough's vibratory action may at all times be carried out fully within the limits of the adjusted range until a properly balanced material supply from the second trough to the third will be maintained. The vibrator of the second will continuously "hunt" in response to signal from the third.

In further accordance with the invention, the third or final vibratory trough of the cascaded supply mechanism also has in its electrical circuit a servo motor-rheostat device of the same type. This is periodically energized through commutation means at a supply feed density-check phase in the rotative cycle of a weighing receptacle, with attendant adjustment of the rate and range of vibration of the third or final supply trough. A uniform density of feed of the latter to the receptacle is thus insured.

Yet another aspect of the invention resides in the provision in the machine of improved material return or conveyor elevator means for both the dribble-fed-off material from the small vibratory receptacle tray, and material discharged at the dump zone of the machine in the event a check underweight or overweight signal has resulted in the absence of a set-up carton at that zone. Such respective conveyor means are similar, the one receiving the dribble-fed-off material, very slight in relative mass, preferably returning this material to an initial vibratory trough of the supply device described above, and the other returning the dump discharged material to the original supply hopper.

A still further object of the invention is to provide a weighing machine having improved carton-feed means associated with each of its traveling receptacle and receptacle weighing means or units. Such carton feed means, as operated coordinately with the carton set-up machine, involves the provision of carton pushers, each associated beneath the "dead" rail mentioned above with the funnel traveling with the receptacle and weighing unit, insuring that the set-up cartons will be propelled coordinately with the weighing unit past the funnel discharge or dump zone at which the "dead" rail is apertured for the discharge of the funnel to a carton.

In general, it is an object of the invention to provide an improved method and apparatus for automatically and continuously weighing discrete materials, in accordance with which a series of individually counterpoised weighing receptacle units are caused to move in an endless path while being vibrated to remove therefrom the excess portion of an initial overweight charge until a desired accurately weighed receptacle content is reached; in which such overweight charge is supplied by an improved cascaded trough mechanism insuring a smooth yet automatically variable density of material flow to the traveling receptacle units, the flow rate being periodically checked and altered, if needed, upon signal from the units; in which during each cycle, and after the charge has been weighed and presumably reduced in weight to a desired value (vibration of the receptacle units then ceasing), each unit is subjected before discharge of its content to an overweight-underweight check, as the result of which either an overweight or underweight indication results in the forwarding of a signal causing the inaccurate content in quetsion to be dumped but not to be boxed; in which there is also a zeroing check on each receptacle unit following discharge of its weighed content to compensate out the effect of possible adhesions to its wall, as well as other effects previously mentioned, i.e., spring variation, contact resistance and/or relay sensitivity changes, and the like; in which both the excess material vibratorily fed off from the receptacles in weighing and the overweight or underweight dumped material are efficiently returned to an original supply source for rehandling; and in which many other significant improvements are made to insure foolproof weighing to the most accurate limits of discrete materials over long periods of operation.

The foregoing as well as other objects will become more apparent as this description proceeds, especially when considered in connection with the accompanying drawings illustrating the invention, wherein:

FIGS. 1, 2 and 3 are perspective views of the apparatus of the invention, FIGS. 1 and 3 showing the weighing machine as associated with a carton set-up machine, and FIG. 3 further illustrating apparatus associated with the weighing machine to receive filled cartons therefrom and further process such cartons;

FIG. 4 is a fragmentary view in side elevation, partially broken away and in vertical cross section through the rotative axis of the apparatus, illustrating the assembly of a weighing receptacle unit of the apparatus with structural means whereby this unit and others similar thereto are rotatively driven and controlled during their rotative travel;

FIG. 4A is a fragmentary view in enlarged scale showing a limit switch actuable by a memory device shown in FIG. 4 as part of the means for initiating a signal in the event of an overweight or underweight;

FIG. 5 is a side elevational view, partially broken away and in vertical section, of the improved cascade type vibratory material supply or feed device of the apparatus;

FIG. 6 is a top plan view of the device of FIG. 5;

FIG. 12 is a fragmentary side elevational view of an assembly of weighing receptacle, scale beam and beam weight control provisions, being in vertical section through the scale beam and housing unit;

FIG. 14 is a fragmentary view showing provisions for adjusting certain beam-responsive overweight and underweight conductors of the beam unit;

FIG. 15 is a fragmentary top plan view of a vibratory rail structure of the weighing machine, by which cartons are supported in travel to and past the discharge or dump zone of the apparatus;

FIG. 16 is a side elevational view of a portion of the rail structure of FIG. 15;

FIGS. 17 and 18 are fragmentary end elevational views, as from the lines 17—17 and 18—18 of FIG. 15, respectively;

FIG. 19 is a side elevational view of one of the rotative discharge funnel components of the machine, the relationship thereto of a weighing receptacle in dumping its contents into the funnel of such unit being indicated in dot-dash line;

FIG. 20 is a fragmentary top plan view of the structure of FIG. 19;

FIG. 21 is a fragmentary elevation of the structure, as viewed from a point approached by the funnel in its rotation, and indicating means to adjust the discharge area of the funnel;

FIG. 22 is a fragmentary view, partially broken away, of one of the two generally similar material return conveyors of the apparatus, being viewed at 90° to the upwardly inclined plane of this unit;

FIG. 23 is a side elevational view of the structure of FIG. 22; and

FIGS. 24A and 24B show, as consolidated, a schematic wiring diagram for the apparatus, and for conciseness these views will be hereinafter referred to as FIG. 24.

Figure 1:
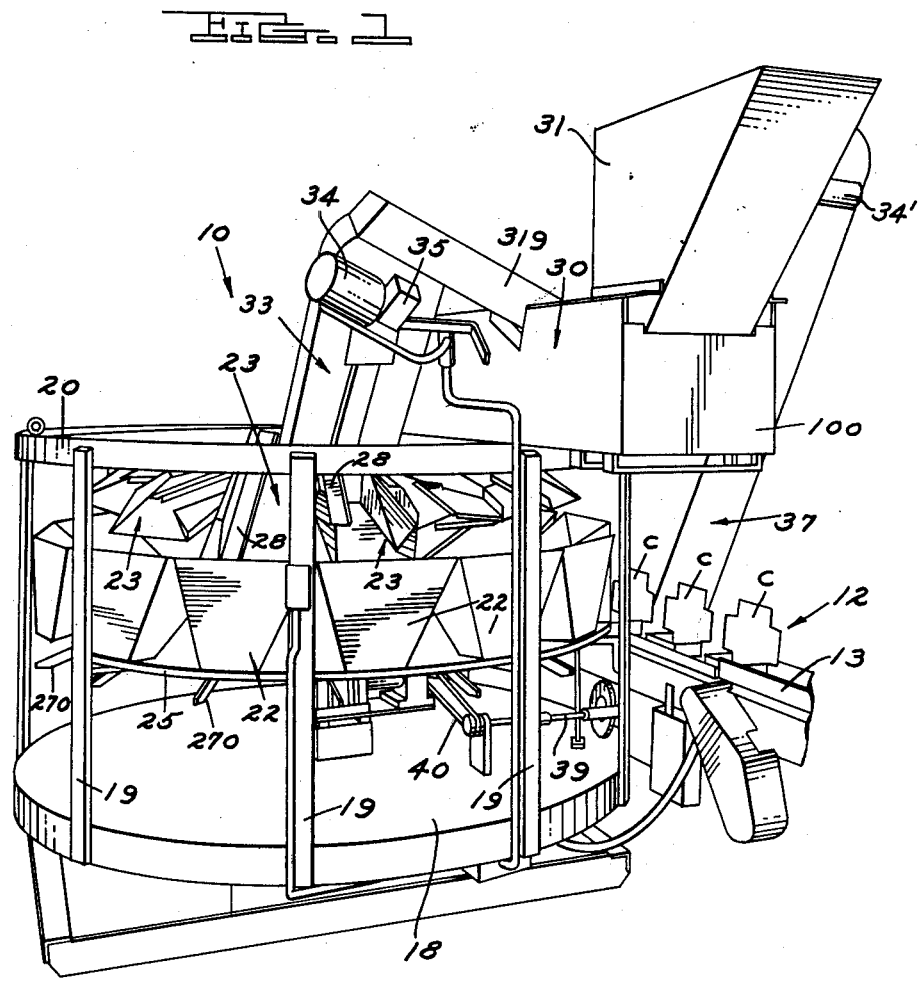

Referring first to FIGS. 1, 2 and 3, the machine of the invention, generally designated 10, is contemplated in some instances to be driven by its own motorized speed reducer drive unit; however, it is also intended that, as shown in the illustrated embodiment, the weigher shall derive its drive from, or be drivingly associated with, an automatic carton set-up machine 12 of conventional nature, of which a portion appears in FIGS. 1 and 3. The machine 12 functions to automatically erect cartons C to be filled with the weighed product from a flat, knockdown condition, depositing the erected cartons upon its conveyor unit 13 (FIG. 1), by which they are advanced to the weighing machine 10, to be filled by the latter with an accurately measured and weighed charge. The machine 10 has carton advancing or pusher members (to be described) one for each weighing unit of the machine 10, of which they may be, for example, fifteen disposed in a circumferentially spaced array; and such pushers continue the advance of cartons, as supplied by the set-up machine conveyor 13, through the weighing machine 10, with one carton disposed beneath and traveling with the product discharging chute or funnel means of each weighing unit.

Generally considered, and as best shown in FIGS. 1 and 2, the machine 10 comprises a framework constituted by a rigid circular, plate-like base 18 which is suitably mounted upon the floor, the base 18 peripherally supporting rigid fixed and circumferentially spaced uprights 19 and a circular horizontal frame piece 20 joining the uprights 19 at the top thereof, this structure being braced by horizontal angle bars 21. Upon such framework various fixed components of the machine 10 are supported.

Discharge funnels 22, one for each of the several weighing receptacle units or assemblies, which are generally designated by the reference numeral 23, are disposed in circumferentially spaced relation to one another, being (like the receptacle units 23 and certain scale beam means supporting the latter, as will be described) carried at the outer ends of radial arms of a rotatively driven spider or cantilever arm structure of the machine. Each of the weighing receptacle units or assemblies 23 is disposed in overhead radial alignment with a discharge funnel 22, being adapted to tilt downwardly to discharge into the latter an accurately weighed measure of the bulk product.

The funnels 22, which are open-ended at their top and bottom, slide at the latter along a fixed annular "dead" plate 25 in the form of a flat-wise disposed ring of substantial width somewhat exceeding that of the lower funnel opening or mouth. Thus the dead plate 25, which is fixedly supported at its outer periphery by the frame uprights 19, seals in each of the funnels 22 a charge of weighed material delivered by its weighing receptacle unit 23, until a funnel discharge or dump zone is reached. At this zone the dead plate 25 has an opening therein through which the funnel's content is usually discharged gravitationally into a carton C propelled directly therebeneath. Such propelling means and funnel are, like the weighing receptacle means, associated with a cantilever arm of the machine in a manner to be described.

Should an overweight or underweight be detected, as indicated above, no carton will be present to receive the funnel's content, and this content will be conveyed away.

Each weighing receptacle unit 23, in general accordance with the Garnett et al. patent identified above, is in the form of a two-part receptacle, of which one part is a sheet metal pan 27 of relatively large size and capacity, adapted to receive from a supply source (to be described) the major portion of a charge of material to be weighed. The other part of each weighing unit 23 is a small capacity, radially elongated, sheet metal vibratory tray 28, adapted to receive material to be weighed from the same source, but in a much smaller measure or quantity. The total charge received by each unit 23 as it passes the supply means amounts to an overweight of the material, proper weight being reached in the rotation of the machine by a dribble feed-off of material from the smaller pan 28 under vibration of the latter. Each weighing receptacle unit 23 as a whole is weighed during the travel thereof by an improved type of self-equalizing, sealed scale beam unit supporting that unit 23, also in a manner to be described.

The machine 10 further comprises the improved cascade type, vibratory material supply mechanism 30. This receives its charge from a fixed and suitably replenished overhead hopper 31, to which certain excess material return elevators or conveyors discharge, as will be described. Of the latter, one, designated 33, is for the purpose of returning to the supply unit 30 the fed-off excess weight product from the weighing unit's vibratory pans 28; while the other conveyor returns to the unit 30 such weighed material as passes from a funnel 22 through the discharge opening 25' (FIG. 20) of dead plate 25 when an overweight or underweight signal results in no set-up carton C being disposed therebeneath to receive the weighed funnel discharge. Conveyor 33 is driven by motor 34 through a speed reducer unit 35; and the funnel discharge or dump return conveyor, designated 37, is of similar character and has a similar drive, as will be described.

Reference has been made to the fact that in the illustrated adaptation of the weighing machine 10 the latter receives its drive from the carton set-up machine 12, although an independent drive may also be furnished. Such coordinated machine drive is effected through the primary agency, as illustrated in FIG. 1, of an input drive shaft 39 to machine 10 which is powered from a suitable output part of set-up machine 12. Shaft 39 drives a chain 40, from which the rotary structure of the machine 10 is in turn driven at reduced speed, as through certain chain and sprocket type reducer means of a known type (not shown). In the alternative, the direction of power transmission might be reversed, as from the machine 10 to the machine 12.

Drive Arrangement

Referring now to FIG. 4, the rigid machine base 18 supports at its apertured center a fixed gear and shaft housing structure, generally designated 46, into which a horizontal shaft 47 extends. This shaft, as driven from input shaft 39 by the speed reducing means referred to but not shown, has a driving worm 48 in fixed coaxial relation thereto, the latter being journaled in the housing structure 46 by tapered radial and axial thrust bearings 49. The hub of an axially elongated worm gear 50 is also journaled and supported in housing structure 46 by vertically spaced tapered bearings 51. Gear 50 is fixedly and drivingly secured, as by a key, to a tubular driving sleeve 52 within housing structure 46, and the sleeve in turn surrounds and is drivingly secured by a key 53 to an upright tubular rotary shaft 54. Shaft 54 is provided with a circumferential shoulder at 55 which rests upon the top of the sleeve 52, thus affording vertical support for the tubular shaft at this zone.

The shaft 54 extends upwardly through a fixed annular plate or mounting ring 57, which is sustained upon the shaft and gear housing structure 46 by means of a plurality of upright post and tubular spacer means 58; and ring 57 serves as a support for an overweight-underweight responsive solenoid 59 (appearing in the wiring diagram of FIG. 24) having a vertically acting plunger 60.

Above the mounting ring 57 the tubular shaft 54 fixedly receives and drives, as through a welded, keyed or integral connection at 61, a tubular sleeve or hub member 62, to the bottom end of which there is fixedly secured a memory disc 63. This disc slidably carries adjacent its periphery a plurality of upright, circumferentially spaced memory pins 64, one for each weighing receptacle unit 23 of the machine, which are adapted to be shifted upwardly by the solenoid plunger 60 upon reception by solenoid 59 of an electrical signal reflecting an underweight or overweight in any of the respective weighing receptacle units following the feed-off of overweight material from the small vibratory pan 28 thereof. Each memory pin 64 is frictionally held in either its upper or lower position by means of a spring detent element 65.

As shown in FIG. 4A, a limit switch 66 (see also FIG. 24) is fixedly mounted on the ring 57 for actuation in a known manner by such memory pins 64 as have been solenoid-elevated in response to an underweight or overweight signal, as these pins reach a predetermined point in their rotary path. They are then re-set downwardly by the usual cam means (not shown).

The closing of limit switch 66 causes a further signal to be transmitted to a mechanism (not shown) of the carton set-up machine 12. Such mechanism may, for example, be a solenoid controlled valve whose operation will cause the machine 12 not to forward on its conveyor 13 a set-up carton. This operation is so coordinated in time with the travel of a funnel 22 containing the overweight or underweight, and sealed at its bottom as it advances along dead plate 25, that the funnel in question arrives at the dead plate dump opening 25' (see FIG. 20) at the same time that there is no set-up carton being pushed beneath that opening by the carton pusher means of the weighing machine (to be described). Such absence of a carton is of course the consequence of the limit switch-originated signal referred to above.

The upper end of the hub member 62, as rotatively driven by tubular shaft 54, has secured thereto, as by bolts 67, the inner hub portion 68 of a large circular casting 69 of centrally apertured, cup-like character, which casting furnishes support for all of the rotating weighing, funnel and carton advancing units of machine 10. Also supported by casting 69 is a series of radially aligned electrical commutator brushes 71 for the take-off (as shown in FIG. 24) of electrical enery for rotating electrical components of the machine.

Casting 69 has bolted to the bottom thereof a plurality of radially outwardly projecting spider or cantilever arms 72, one for each of the weighing units 23 and its scale beam unit (to be described), by which unit 23 is supported on arm 72. The arms 72 also support the funnels 22 and carton pushers (to be described) for rotary travel with their respective associated units 23.

The reference numeral 73 designates a fixed vertically elongated upright tube which extends coaxially through tubular shaft 54. This tube is received adjacent the top thereof in the fixed inner race of a ball bearing 74, the outer race of which is fixed within the hub 68 of rotary casting 69. The lower end of fixed tube 73 extends downwardly through an aperture of a bottom cap 75 of the fixed housing structure 46, being in fixedly keyed relation to the cap 75.

Tube 73 is employed as a conduit for vertically extending wiring leads, generally designated W in FIG. 4, as well as a conduit for filtered and forced air (which may also be heated if desired). Thus, at its upper end the tube 73 has welded or otherwise fixed thereto a hollow inverted cap 77 which is radially apertured at 78, for the radial exit of the wiring W, and at 79 for the radial exit of pressurized air from a suitable blower source (shown only in FIG. 24) which thus discharges past the weighing units to maintain the latter clear of dust, fragments of weighed materials and the like.

The cap 77 also serves as a support for a fixed circular, insulated commutator plate 81, on the lower side of which are mounted in conventional manner a plurality of concentric commutator rings and segments, discussed in connection with FIG. 24, for the distribution of current through suitable supply and distributing means. A fixed cover plate 83 encloses commutator plate 81 from above.

Figure 13:
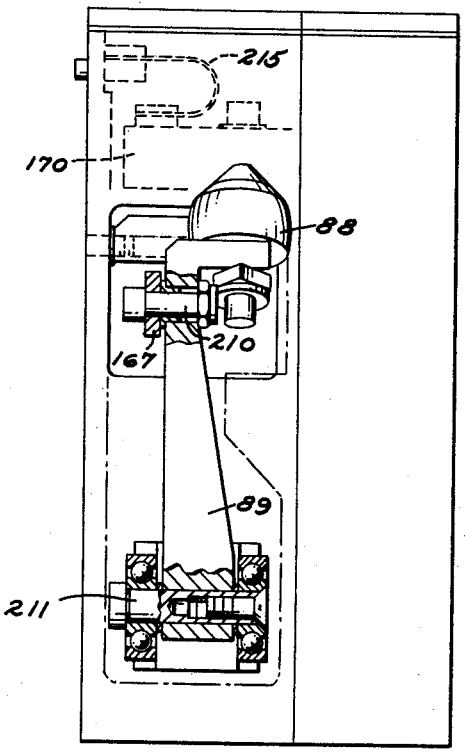
FIG. 13 is an end elevational view of the scale beam unit and certain cam-actuated control means for the scale beam components, as from the right-hand side of FIG. 12.

At its top, the fixed tubular cap 77 has coaxially bolted thereto a circular plate cam 85 designed to provide a downwardly opening cam groove 86 inwardly of its periphery, and also to provide a downwardly facing annular cam surface 87 about its bottom perimeter. As shown in FIGS. 4, 12 and 13, the groove 86 receives the follower roll 88 of each of a series of pivoted link operating arms 89, one for each scale beam assembly (to be described) of a weighing receptacle unit 23. Arms 89 control the tilting of the receptacle units at a dump zone to discharge the weighed content.

Similarly, a number of followers 91 ride beneath the downwardly facing cam face 87. These followers are utilized in the hereinafter particularly described zeroing adjustment of the weighing beams of the respective individual scale beam units, which are generally designated 93. A receptacle unit 23 is pivotally supported on a scale beam of each unit 93.

As illustrated in FIGS. 4 and 12, each scale beam unit 93 is secured by bolts to the top of a radially extending spider or cantilever arm 72, which is itself bolted to the bottom of rotary casting 69. Operating parts of the scale beam unit are enclosed and sealed dust-free in a lightweight aluminum, box-like housing 94, which is removably covered by a top closure plate 95.

With the foregoing description of the provisions for mounting and rotatively driving the receptacle weighing and commutation components of machine 10, it is in order to turn now to the improved provisions of the cascaded vibratory device 30 for automatically supplying the dual type weighing receptacle units 23 with charges of material to be accurately weighed during dribble feed-off in rotary transit.

*Cascade-Type Vibratory Supply Mechanism*

Figure 7:
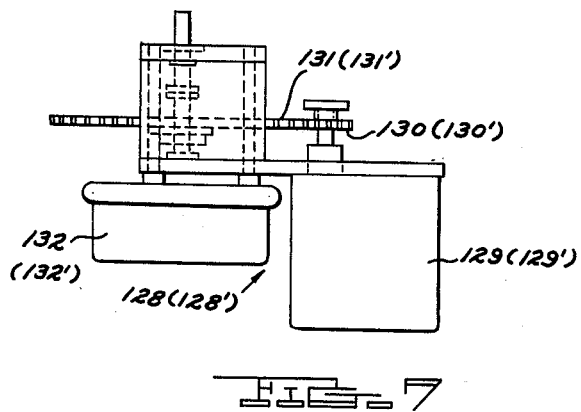
FIG. 7 is an elevational view of a typical servo motor-controlled rheostat unit, such as controls the adjustment of the range of vibratory rates of the vibratory trough means of the supply device of FIGS. 5 and 6.
Figure 8:
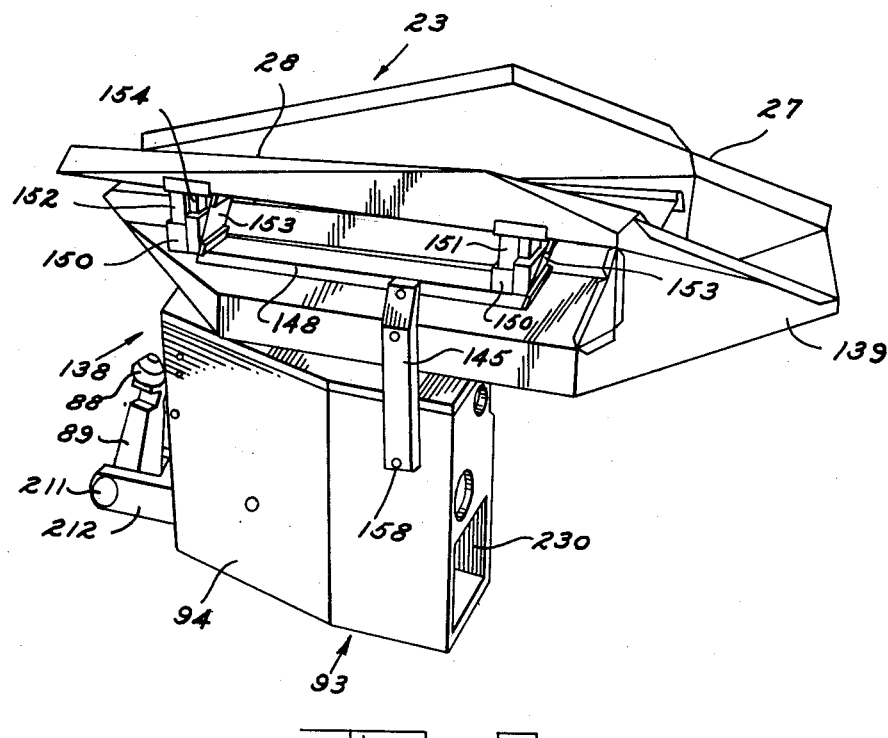
FIG. 8 is a perspective view of a typical weighing receptacle unit of the apparatus, of which there are a number rotatably carried in circumferentially spaced relation to one another in the operation of the machine, this view indicating the manner in which a dual material receiving receptacle is pivotally mounted upon an improved scale beam housing contemplated by the invention.

Referring to FIGS. 5–7 in conjunction with FIGS. 1, 2 and 3, the operating components of the material supply device or mechanism 30 are housed within an elongated, upright-walled rectangular enclosure 100 which is appropriately mounted fixedly at an elevated level on the machine frame structure, as at the upper circular frame member 20 (see FIGS. 1–3). Adjacent the left-hand end of this enclosure 100, as viewed in FIGS. 5 and 6, a vibratory device 101 of the syntron type is fixedly mounted, as by brackets 102 supported on enclosure 100, to extend upwardly within the latter's side confines. The purpose of the device 101 is to vibrate a first sheet metal supply receptacle or trough 103, which is supplied from above by the hopper 31, with material to be weighed. This hopper is also preferably provided with means, shown only in FIG. 24, to vibrate it for efficient gravitational discharge.

The vibratory device 101 is capable of being vibrated at relatively low or high arbitrary rates, one perhaps twice as great as the other, so that as the supply receptacle or trough 103 is agitated thereby, material will be discharged at a desired rate over the forward or right-hand lip of that trough. The trough 103 is supported for vibration by the device 101 through the agency of a pair of longitudinally spaced, upwardly inclined flexible straps 104 on the vibrator which connect with downwardly projecting bracket parts 105 on the bottom of the trough.

Vibrator 101 is normally driven at a given, relatively low rate through a circuit including control resistance means, as appears in FIG. 24 and will be hereinafter referred to. However, if the supply at this rate is insufficient to the demands of the system, this is reflected in an electrical signal from a second, beam-supported and balanced vibratory trough or receptacle 107, which is in longitudinal alignment with the trough 103 and positioned beneath the right-hand discharge lip of the latter to receive material therefrom.

Thus, should the material supplied in a rough manner from trough 103, as vibrated at its normal, relatively "low" rate, be inadequate to keep trough 107 in balance, a relay is energized to cut out the resistance means in the circuit of vibrator 101, throwing the latter into "high" rate vibration to at least momentarily correct the condition.

As indicated above, the second vibratory receptacle 107 is a balanced or counterpoised one; and its function is to provide a first, smoothing out of the thickness and flow of material therealong, as roughly received from trough 103. The receptacle 107 is provided across its top with a pair of transverse bars 108, these bars supporting means including generally upright flexible springs 109 by which the receptacle 107 is sustained from above. Such support derives from an inverted second vibratory device 110 similar to the device 101. Vibrator 110 is in turn suspended beneath a scale beam structure or unit 112 within the enclosure 100.

The structure 112 comprises a central longitudinal beam member 113 having bolted to the top thereof a transverse bar 114 which is formed at its ends to provide knife edges 114a which rest upon fixed V-blocks 115 on the upright side walls of enclosure 100. A threaded extension rod 116 welded to the right-hand end (FIGS. 4 and 5) of beam 113 adjustably carries a pair of counterweights 117.

Vibratory device 110 is resiliently mounted to depend beneath the thus counterpoised beam 113 by means of fore and aft pairs of headed bolts 119 extending through apertures of beam 113, with the heads of the bolts 119 resting upon rubber cushion rings 120 received in counter bores of the beam apertures, and with the bolts threaded into the vibratory device 110. Thus, the second vibratory receptacle 107 is agitated in the direction indicated by the double-ended arrow in FIG. 5, the cushioned suspending connections of vibratory device 110 to the scale beam 113 isolating or minimizing the effect of the agitation on the beam.

At one transverse end thereof the knife blade bar 114 on beam 113 is provided with a longitudinally projecting arm 122. This arm adjustably receives a threaded set screw 123 adapted to actuate a limit switch 124 fixed on the side of a wall of the enclosure member 100. The outermost end of arm 122 is disposed between a pair of adjustable limit set screws 125 carried by the enclosure wall, the screws serving to limit the amplitude of swing of arm 122, hence of the knife bar 114 and scale beam 113.

As in the case of vibratory device 101, the vibratory device 110 is capable of being energized at either a normal "low" rate or at a "high" rate. Furthermore, its "high" and "low" limits of vibrational intensity are capable of being coordinately shifted up and down. This is in response to a continuously hunting electrical signal derived from a third counterpoised and vibrated trough or receptacle 127 of supply mechanism 30 and applied through the agency of a servo-motor and rheostat unit such as is shown in FIG. 7 of the drawings. This electrical control will be later described.

The third vibratory trough 127 is mounted forwardly beneath and in receiving relation to the second vibratory receptacle 107. Its provisions for mechanical balancing and vibration being identical to those associated with receptacle 107, they are designated by corresponding reference numerals, primed, and further description thereof is dispensed with for the sake of simplicity.

A signal originated through the limit switch 124' of the third trough 127 is employed to control the arbitrary "high" or "low" adjustment of the vibratory rate of the second trough 107, as well as its corresponding range variation mentioned above; while the rate of vibration of third trough 127 is controlled through a check point signal which is commutator-derived during the trim-off phase of the rotative cycle of the receptacle unit 23. These matters are further discussed in connection with the wiring diagram of FIG. 24.

As indicated above, there is a wide range between arbitrarily adjusted "high" and "low" feed rates (say 2:1) of the first trough or receptacle 103, in accordance with the degree of energization of its vibratory device 101. There is substantially lesser range of vibratory rate of the second receptacle 107 between its high and low values, whatever they may be adjusted to, for example, a spread of 15%. The rate of vibration of the third trough 127 is a gradually changing, hunting one, having no arbitrarily fixed upper and lower limits.

In operation, in the event of an insufficient rate of discharge of material from the first receptacle 103 to the second receptacle 107, the scale beam 113 of the latter will tilt clockwise (FIG. 5) about the fulcrum of its knife edges 114a, causing set screw 123 to engage and close the limit switch 124. This results in a electrical relay signal (as will be described in connection with FIG. 24) whereby the energization of vibratory device 101 is raised to a maximum to bring a discharge to second receptacle 107 such as will restore the balance of its scale beam 113. Should the supply to receptacle 107 then be excessive, the vibrator 101 will be returned to its low rate. The value of the respective vibratory rates of unit 101 may be adjusted manually by rheostat.

In the case of the third vibratory receptacle 127, a signal from its scale beam 113' and switch 124', requiring an increase in the rate of supply from the second receptacle 107, will put the latter into its high vibratory rate immediately. However, it is to be emphasized that both of the second and third scale mechanisms 112, 112', in addition to the effect their respective limit switches 124, 124' in altering the energization of the preceding vibratory device 101 or 110, have their respective own vibratory rate ranges adjusted. This results, as indicated above and in the case of the second scale mechanism 112 and its vibrator 110, from the action of a servo motor and rheostat unit, generally designated 128 (FIG. 7) of which there is also one, designated 128', for the third scale beam unit 112'.

The servo units 128, 128' in question are not associated physically with the cascaded feed mechanism of FIGS. 5 and 6, but are instead mounted in a control console of the machine, being wired in the circuitry as shown in FIG. 24. Since the two servo motor-rheostats 128, 128' are identical, parts of the latter corresponding to those of the former are indicated by corresponding reference numerals, primed.

As shown in FIG. 7, the unit 128 includes a servo motor 129, the shaft of which reversibly drives a pinion 130 which meshes with a gear 131 on the shaft of a rheostat 132 wired (FIG. 24) in the circuit of vibrator 110, thus to adjust the resistance of the circuit when motor 129 is energized.

As indicated above, an adjusting action of the rheostat 132 will have the effect of shifting the entire high-low range or band of vibration of the second trough or receptacle 107 in one direction or another coordinately with an "increase" or "decrease" signal originated at the scale beam of the third vibratory trough 127. For the above purposes a relay energized when limit switch 124' closes is employed to both arbitrarily adjust the vibratory rate of device 110 from "low-" to "high" and to operate the motor 129 of the servo motor rheostat unit 128.

Similarly, adjustment of the rheostat 132', in response to a commutator-transmitted signal, originated during a check phase from the scale beam unit 93 of a weighing receptacle 23 in a manner to be described, will adjust the vibratory range or band of the third vibrator 110'. Thus, the respective servo units 128, 128', operate to hunt, continuously to maintain a correct setting of the whole vibratory range of the second and third vibratory units. With the cascaded first, second and third troughs or receptacles of the supply device 30 controlled as to vibration in the manner described, there results a successive smoothing of the feed of material therealong to a discharge at a desired and highly uniform density from the right-hand lip of the third trough 127 (FIGS. 5 and 6) to a weighing receptacle unit 23 then passing therebeneath.

*Weigher Head Assembly*

There is a weigher head assembly 138, as shown in FIGS. 4 and 8 through 14, carried by each of the traveling cantilever arms 72 of casting 69, along with an associated discharge funnel 22, each assembly 138 generally comprising one of the scale beam units 93 and one of the weighing receptacle units 23 supported thereon in the manner to be described.

The vibratory trim-off tray 28 of receptacle unit 23 is supported above and between the circumferentially spaced side confines of the major or bulk portion-receiving pan 27 of the receptacle. The member 27 is of rather complex sheet metal construction, best depicted in FIGS. 1, 2, 3, 8, 10 and 12, being characterized by a radially outwardly opening, laterally shielded, funnel-like discharge mouth 139. The mainly significant feature of unit 23 is that its trim tray 28 extends radially inwardly or to the right, as viewed in FIG. 12, to overhang the return conveyor structure 33 so that material vibrationally discharged from tray 28 in travel will fall to said trim return conveyor 33 (to be further described in detail) to be elevated and discharged to the cascaded supply device 30 described above. It is to be understood that both of the receptacle parts of each unit 23 are simultaneously supplied with material by the supply mechanism 30 of FIGS. 5–7, the total charge representing an overweight.

Figure 10:
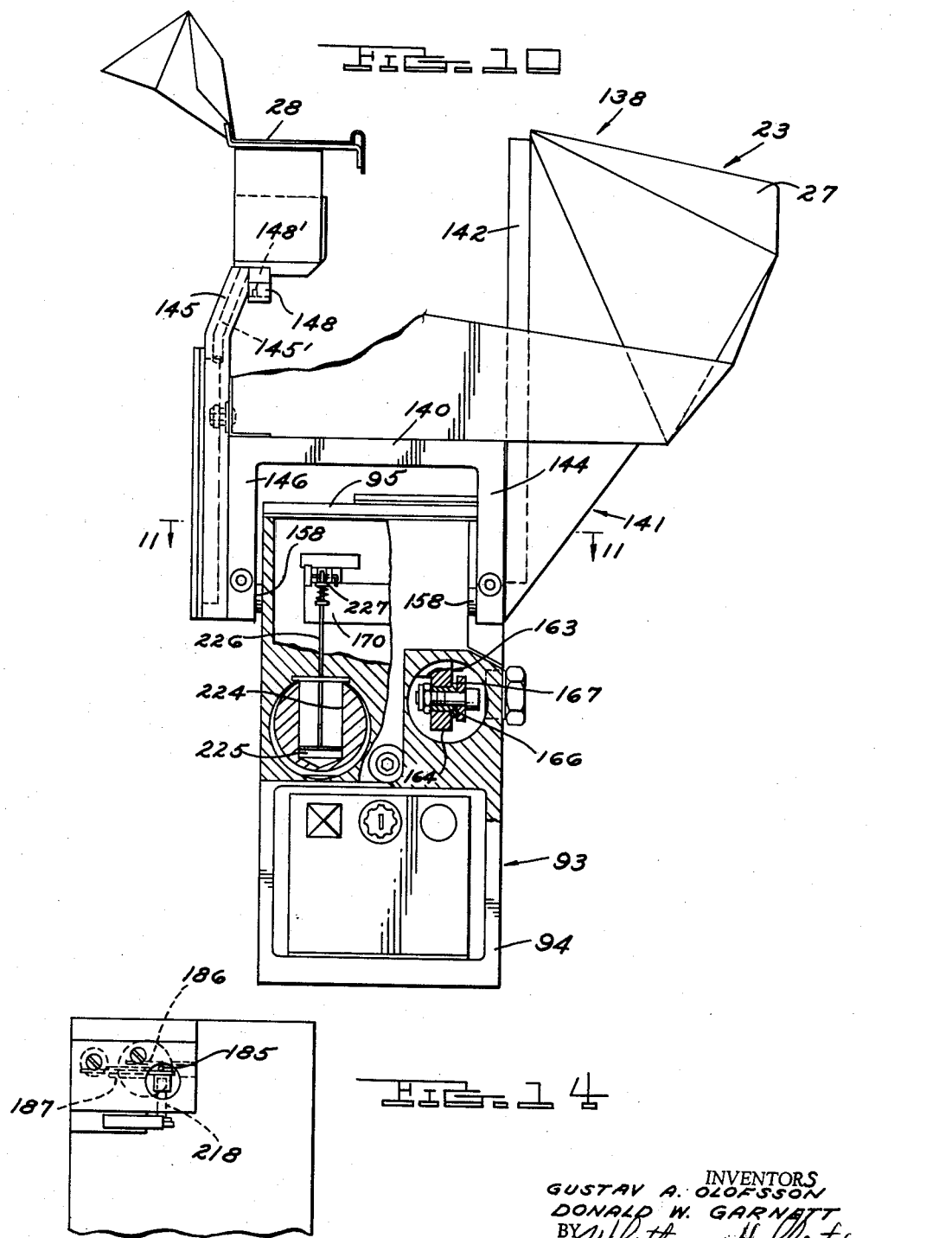
FIG. 10 is an end elevational view, partially broken away and in transverse vertical section, of the weighing receptacle unit or device of FIG. 8.

The reference numeral 140 designates a mounting saddle for the material receiving members 27, 28 which is, as best illustrated in FIG. 10, of inverted U-shaped outline, downwardly straddling the side walls of the housing 94 of scale beam unit 93. Suitable bracket means 141, including a pair of upright front and rear posts 142, 143 (FIGS. 10 and 12) support the major material receiving pan 27 on an outer side of one downturned leg 144 of saddle 140; and a further upright post 145, rigidly secured to the outer side of the other depending leg 146 of the saddle, is operatively connected to the vibratory trim tray 28 as a support for the latter.

This connection is made through the agency of a radially elongated arm 148 (see FIGS. 8 and 12) of some degree of flexibility, which is spot-welded to the upper end of the upright post 145, a function of this flexible arm 148 being to isolate to a considerable degree the vibration of the trim-off tray 28 from the balanced components within the scale beam housing 94 which will be described. At its opposite ends, the arm member 148 carries fixedly a pair of relatively massive blocks 150, upon which there are mounted the wound cores of a pair of electromagnets 151, 152 which are adapted to be supplied with a rectified A.C. voltage. Inclined leaf springs 153 extend upwardly from the respective blocks 150 to support tray 28 from the flexible arm 148, these leaf springs preferably being attached to steel armature plates 154 fixed on the tray, with an air gap 155 between each armature plate and its associated electromagnet 151 or 152.

Thus, upon energization of the electromagnets during the trim-off phase of the cycle of operation of the machine, the tray 28 will be rapidly vibrated upon the leaf springs 153 in the direction indicated by the double-ended arrows in FIG. 12, with the result that there will be a dribble feed of an excess of the material being weighed off the radially inner end of tray 28, until the total content of the traveling weighing receptacle unit 23 has reached proper and accurate weight. The blocks 150 through which the tray is flexibly connected to arm 148 act as reaction members absorbing the acceleration forces of the tray in vibration, as well as acting in conjunction with the flexible arm 148 to isolate excessive vibrational transmission through post 145 to the saddle 140, hence to the scale beam structure upon which the saddle is pivotally carried, in a manner now to be described.

Figure 9:
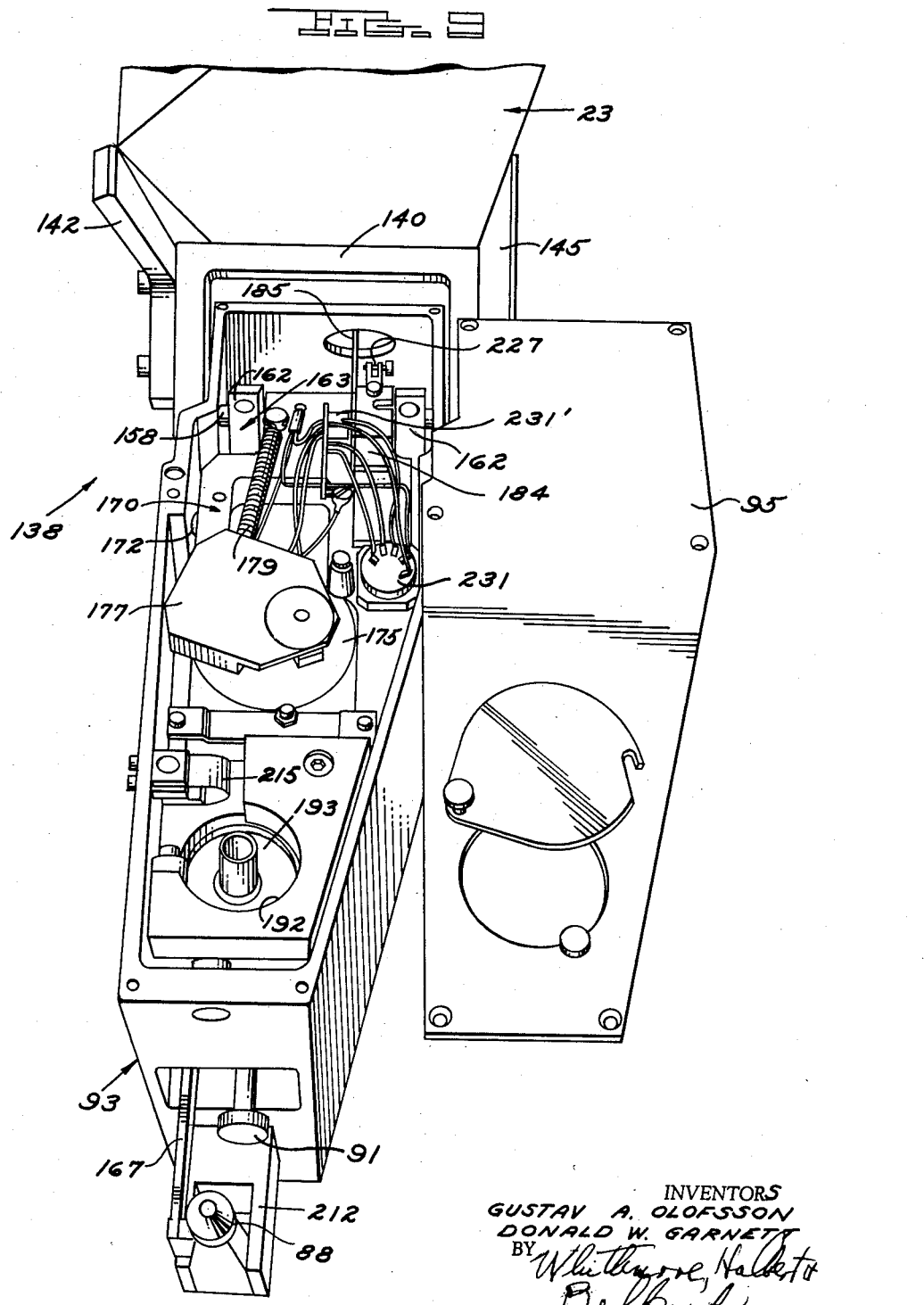
FIG. 9 is a perspective view of such improved scale beam unit or device, with the cover plate thereof removed to show the general arrangement of scale beam and master weight and compensating tare weight components within the housing.
Figure 11:
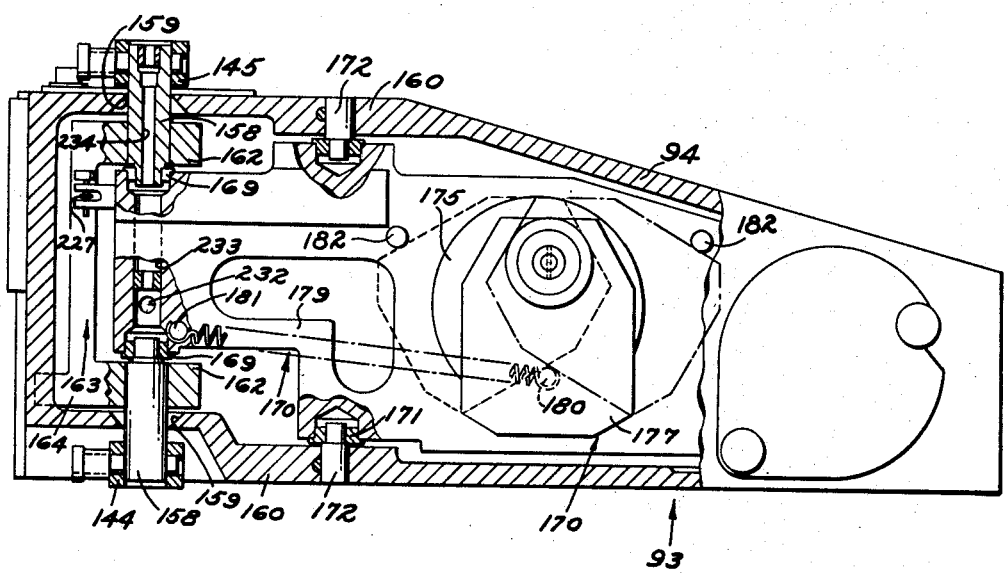
FIG. 11 is a top plan view of the scale beam unit, being partially broken away and in horizontal cross section to illustrate various scale beam and housing trunnion provisions.

As best illustrated in FIGS. 10 and 11, the saddle arms 144 and 145 each have fixed to the lower end thereof a short trunnion pin 158 extending through an enlarged opening 159 in one of the upright side walls 160 of scale beam housing 94; and trunnions 158 are fixed, within these housing walls, to the parallel arms 162 of a yoke 163 (FIGS. 9, 11 and 12). This yoke has adjacent one of its arms 162, an integral, downwardly and radially outwardly projecting arm extension 164 (see FIG. 12).

Thus, the saddle 140 and the yoke 163, both being fixed to the trunnions 158, in effect constitute a bell crank; and the arm 164 of the yoke has a pivotal connection 166 at its lower end to a radially elongated actuating link 167, for the purpose of tilting and discharging the contents of the receptacle unit 23 in a manner to be described. The link 167 also acts as an arm horizontally paralleling the scale beam 170 and the line through its trunnion axes at bearings 169 and 171, so as to counteract any tendency of the tray structure 23 to tilt in weighing.

As appears in FIG. 11, the inner ends of the trunnions 158 are provided with ball bearings 169 journaling the same in opposite sides of the forward end of a radially extending scale beam, generally designated 170. This beam is itself journaled by means of bearings 171 and fixed trunnions 172 on the walls 160 of housing 94, in a location somewhat to the rear of the saddle trunnions 158.

Radially to the rear of its pivot bearings 171, the scale beam 170 fixedly mounts a small electrical reversing motor 175 for scale zeroing; and an upwardly extending shaft 176, suitably connected through reduction gearing to the motor shaft, has fixedly and eccentrically mounted thereon an adjustable tare weight 177 (FIGS. 9, 11 and 12). This weight is adapted to be adjustably positioned in a horizontal plane in response to energization of the motor 175 in one direction or another. This is for the purpose described above of zeroing the scale beam 170, just after a weighed receptacle charge is dumped, in order to compensate out the added effect on the scale beam 170 of the weight of any grease, salt, flavoring or other coating material or film left by the discharge product to adhere to the receptacle unit 23.

The weight 177 is biased clockwise, as viewed in FIG. 11, by means of a coil tension spring 179 extending from an eccentric connection at 180 to the bottom of the weight to a fixed anchor at 181 on the scale beam 170. The function of spring 179 is to take up any play which may exist between the weight 177 and its connections to motor 175. Motion of the weight in opposite directions is limited by a pair of upright stop pins 182 on the scale beam.

Adjacent its radially outermost end, as best shown in FIGS. 12 and 14, the scale beam 170 fixedly carries an insulated block 184, from which a tungsten conductor wire 185 extends outwardly to a position between a pair of upper and lower fixed tungsten contact elements 186, 187, respectively. These conductors, the wiring of which is shown in FIG. 24, are employed in terminating the vibration of tray 28 when proper weight has been reached by the trim-off phase, in the making of a final overweight or underweight check just after the trim-off part of the rotation of the machine has been completed, regardless of the prior termination of vibratory action; and in the energization of the eccentric operating motor 175 for the periodic zeroing operation just described, if the scale beam 170 determines that it is needed; and they also function in the making of the check of the rate of supply of material to be weighed by supply mechanism 30 to the receptacle unit 23 during each cycle of rotation thereof, i.e., midway of the trim-off phase, as earlier described above.

Referring to FIGS. 9 and 12, the scale beam 170 has, adjacent its radially inner end, a circular opening 192 formed therein to extend downwardly therethrough, and a cylindrical master weight 193 normally rests upon an annular seat member 194 positioned in a counterbore of opening 192. The master weight 193 is manipulated as an incident of the zeroing operation, which results in an adjustment of the eccentric tare weight 177 to bring the free or unweighted scale beam 170 to proper balance when the weighing receptacle unit 23 is empty.

Thus, the master weight 193 is chosen in a proper value to exactly counterbalance the minimum weight value of the content only of a receptacle unit 23, as imposed on scale beam 170 through the saddle 140. The master weight value will of course depend upon the respective relative lengths of the moment arms of the saddle's trunnions 158 from the beam pivot at 172, and from the center of the master weight to the same pivot.

Master weight 193 is provided with a downwardly opening conical seat 196 (FIG. 12) into which the conical nose of an unseating pin or rod 197 is adapted to be upwardly projected during the time when the zeroing test is being performed, with the receptacle unit 23 empty. The result is that master weight 193 is elevated off its seat 194, thus relieving scale beam 170 of a weight exactly counterpoising the intended ultimate weight of the material in weighing receptacle unit 23. Thus at this time the scale beam 170, as biased solely by the empty weighing unit 23 and associated connections, should be in exact balance. However, if excessive granular or fatty material remains in the receptacle, its slight weight will cause scale beam 170 to swing counterclockwise (FIG. 12) ever so slightly about the pivot 172, thus separating the tungsten contact element 185 from engagement with upper tungsten contact wire 186. This de-energizes a relay through agencies shown in FIG. 24, causing the counterweight 177 to be swung counterclockwise (FIG. 11), or to the right in FIG. 12, a slight distance to counterpoise and cancel out the effect of the collected material.

The master weight lifting rod 197 is biased downwardly, as shown in FIG. 12, by a coil spring 200 acting between the lower end of a sleeve 201 which the rod is slidingly mounted and a bottom collar 202 on the rod 197. The latter also carries a small radially outwardly projecting pin 203 engaged from beneath by an operating finger or lever 204 which has a pivot at 205 to the scale beam housing 94 to 205. Lever 204 has the cam follower 91 rotatably mounted at its radial inner end, i.e., outwardly of housing 94 (see also FIG. 4), this follower riding the fixed cam surface 87 for actuation to operate the masterweight lifter rod at the proper phase for zeroing.

Access to master weight 193, for example to replace the same by another weight in the event a different weight charge is to be handled, is had through a hole 206 in the removable cover 95 of housing 94 which is normally closed by a pivoted disc 207. It is contemplated that additional annular make-up weights (not shown) may also be added to a basic master weight 193, as determined by the intended weight of the charge of material being handled, by slipping such make-up weight or weights over an upright stem 208 of the master weight.

Referring to FIG. 12, the actuating link 167 extends radially inwardly or to the rear through the scale beam housing, from its pivot at 166 to yoke 162 to a pivotal connection at 210 to the arm 89 whose follower 88 rides in the fixed cam groove 86. The bottom of arm 89 is pivotally mounted on a horizontal axis at 211 to a bracket 212 fixed on the radially inner upright wall 213 of housing 93.

As illustrated in FIGS. 9 and 13, a leaf spring 215 is secured at one end to an upright side wall 160 of housing, this spring bearing downwardly upon the scale beam 170 adjacent the rear of the latter. The purpose of leaf spring 215 is to effect a certain scale position for any condition of balance, thus enabling electrical contacts 186 and 187 to sense a state of overweight (when conductor 185 engages contact 187), acceptable weight (when neither of the contacts 186, 187 is engaged) or underweight (when contact 186 is engaged). Without leaf spring 215 only a state of overweight or underweight could be sensed.

As shown in FIGS. 12 and 14, provision is made to adjust the lowermost fixed tungsten contact 187, as by means of a manually operable pin 218 threadedly engaging an outer housing part 219 and provided with a small insulating cap 220, which engages contact 187 to cause adjusting movement of the latter, in one direction or another, thereby varying the gap between the contacts 186, 187, and thus adjusting the range of acceptable weights sensed when conductor 185 engages neither of these contacts. Zeroing is performed at a minimum acceptable weight level and the acceptable overweight level can be selected in accordance with what the packager deems to be economically advisable.

Limitation of the travel of scale beam 170 in rotation about pivots 172 is provided by a rearwardly extending finger 221 on the beam extending between a pair of fixed stops 222 mounted in scale housing.

Provision is also made, as illustrated in FIGS. 9, 10 and 11, to dampen out abrupt vibratory and other disturbing effects on the scale beam 170. This is done through the agency of an oil filled dashpot cylinder 224 and plunger 225 therein, the plunger being connected upwardly by a rod 226 to the radially outer end of scale beam 170, as at 227.

Various electrical components of the weigher head assembly 138 are mounted within a lower compartment 230 of the housing 94 of scale beam unit 93. As best seen in FIG. 9, leads from the electrical components in the lower compartment are brought up to an insulated terminal block 231. Two of these leads extend to contacts 186 and 187. Further flexible leads transmit the electrical circuits to the scale beam 170 via another insulated terminal block 231'. Leads from terminal block 231' continue to the zeroing motor and electrical contact 185. Leads are also taken into and brought outwardly of the housing through a radial opening 232 (FIG. 11) to a hollow horizontal transverse bore 233 through the forward end of scale beam 170 and via an aligned bore 234 through one of the saddle trunnions 158 leading to the exterior. As shown in FIG. 10, these leads extend upwardly through a passage 145' in bracket 145, thence longitudinally through a passage 148' in arm member 148 to the electromagnets 152. A slight twist of such wiring leads occurs during the operation of the mechanism, but by no means of a destructive degree.

*Carton Handling and Funnel Structure*

FIGS. 15 through 18 show salient features of a structure, generally designated 240, which receives a carton C from the carton set-up machine 12 and, under propusion of the carton by means traveling with the weighing structure described above, advances the set up carton, coordinately with one of the discharge funnels 22, past a dump zone of the machine.

Thus, a segmental arcuate rod 241 is appropriately mounted to the main frame structure to horizontally span the general output zone of the machine 10, commencing from the point at which set up cartons C are supplied thereto by the conveyor 13 of setup machine 12 and extending past the point at which the discharge funnels 22, in passing over the discharge opening 25' (FIG. 20) of dead plate 25, discharge the funnel content into a carton, or, in the absence of a carton, to a suitable trough which returns the overweight or underweight discharged content to the inclined conveyor 37 for return to the overhead hopper 31.

The rod 241 is appropriately sustained on the machine frame in this general zone by any appropriate means. As appears in FIGS. 15, 16 and 17, a bracket 242 fixed on an upright 19 extends inwardly therefrom and serves as one support for the rod 241. This bracket 242 also serves, through the agency of an angle member 243, as a support for one end of a pair of parallel arcuate carbon slide rails 244, along the upper surface of which carton C is propelled by pushers (to be described in specific connection with FIGS. 19, 20 and 21) which are associated with the several weighing and scale beam units 138 of the machine. The bracket plate 242 also supports, through the agency of upright elements 245, a corresponding end of a pair of parallel, vertically spaced arcuate carton confining rods 247. These parallel in their arcuate contour that of the rails 244 and rod 241, being at an elevation somewhat higher than the latter.

It will be noted by reference to FIG. 16 that the rails 244 and rods 247 incline somewhat downwardly from the approximate midpoint thereof, as viewed in that figure. This is for the purpose of enabling a carton C being propelled along the rails to depart gradually vertically downwardly away from the spout of the discharge funnel 22, the cartons having received their charge by this time, so that the top material of the charge shall not be scraped out of the carton by the lower edge of the funnel structure.

Rail extension pieces 249 are provided in longitudinal alignment with the respective rails 244, but in longitudinally spaced relation thereto, and the rails and rail extensions are connected at the intervening space therebetween by arcuate connectors 250, 251. These radially outwardly and inwardly shaped elements provide an interval in the track length at which elongated objects, such as French fried potatoes being pushed along the rails 244, may drop down rather than continue travel along with a carton pushing the same.

As illustrated in FIGS. 15 and 18, a vibratory device 253 is provided for the agitation of the rails 244 to promote the compacting into a traveling carton of a charge of material received thereby. Device 253 is supported from the base 13 by an upright post 254, and is provided at its top with a plate 255 to which an adjacent end of the carton slide rails 244 are welded. The side restraining rods 247 are in this zone supported respectively by a fixed bracket 258 attached to another post 19 and by a rod 259 fixed to and extending upwardly from a fixed platform 260 on the upper end of post 254, upon which platform 260 the vibratory device 253 is supported. Leaving the rails 244, which diverge at their right-hand ends (FIG. 15) from the inner guide rod 241, the filled cartons C are discharged onto a belt conveyor 263 (FIG. 3), by which they are conveyed to an appropriate carton closing mechanism (not shown).

*Carton Pusher and Funnel Assembly*

As illustrated in FIGS. 19–21, each of the radially extending spider or cantilever arms 72 upon which a scale beam housing unit 93 is supported, along with a weighing receptacle unit 23 mounted to the beam unit, is provided at its outer end with a downwardly and radially outwardly inclined pusher arm 266, spaced somewhat to the rear of the cantilever arm 72 (in reference to the direction of its rotative advance) by means of a block 267 which mounts the pusher to that arm. Medially of its length, the pusher 266 has bolted thereon a vertically depending bracket 268, which provides a pivot at 269 for a carton pusher finger 270. This finger is guided for swinging movement between bracket 268 and a small fixed retainer plate 271; and at a predetermined point in the rotative travel of the pusher 266 its pusher finger 270 rides up upon the arcuate inner rod 241, raising the pusher finger from the solid line to the dot-dash line position illustrated in FIG. 19. This takes place only in the arcuate filling or discharge zone at which the fixed dead plate 25 is not supported by one or more angle iron brackets 272 from frame uprights 19, so that there will be no interference with the elevated pusher finger 270 in the carton filling zone. Departing from that zone and its sliding support by the arcuate rod 241, the pusher finger 270 gravitationally resumes its solid line position appearing in FIG. 19. One of a pair of fixed pins 274 extending laterally from the bracket 268 limits the downward movement of pusher finger 270, these pins also mounting the retainer plate 271 to bracket 268 in spaced relation to the latter.

At its outer end, each of the pusher arms 266 has bolted to one side thereof a rectangular discharge box 276, open at both its top and bottom ends, with which a sheet metal hopper portion 277 is fixedly associated to constitute a discharge funnel 22. Portion 277 has upwardly flaring walls of the character appearing in FIGS. 19–21, and is suitably secured appropriately, as by welding, to extend within the upper end of funnel box 276. One wall of hopper portion 277 is supplemented by an adjustable metering plate 279 extending into the box portion 276; and plate 279 is adjustably held in place by wing nut and screw means 280 (FIG. 21) taking into an inclined wall of hopper portion 277. Adjustment of metering plate 279, as between the solid and dotted line positions of FIG. 21, accommodates the discharge of funnel 22 to cartons C of different horizontal dimensions.

Thus, as the weighing receptacle unit 23 is tilted upon its support scale beam housing 93 (upon cam operation of the tilting links 67) to discharge into a funnel 22, i.e., in the dot-dash line of the weighing unit 23 appearing in FIGS. 4 and 19, the discharged contents are laterally confined by the funnel 22, and are downwardly sustained, in sliding along the dead plate 25, until arrival at the dump or discharge opening 25′ of the dead plate. This takes place over a considerable arc of travel of the funnel, i.e., from the time that the limit switch 66 is closed in response to an overweight or underweight signal to the time that a carton pusher finger 270 arrives at dead plate dump opening 25′, unaccompanied by a carton as the result of such signal. In this event the charge gravitates onto an inclined trough 282 (FIG. 3) and to the upwardly inclined conveyor 37 for return to the hopper 31, and re-entry from the latter to the cascaded material supply mechanism 30. Discharge return conveyor 37 dumps its content thus received through the dead plate into an inclined trough portion 283 (FIG. 3) at its top, which in turn dumps through an opening 284 in the wall of hopper 31.

Return Conveyor Structure

The trim conveyor 33 appearing in FIGS. 22 and 23 and the discharge or dump return conveyor 37 are structurally very similar, so that structural features of the latter will be understood to be closely similar if not identical to those of the trim conveyor 33, hence not requiring further illustration or description.

As shown in FIG. 22, there is an arcuate trim-off zone through which the traveling trim trays 28 discharge material in order to reach accurate weight. They do so into an inclined fixed receiving trough or chute 288 associated with the conveyor unit 33. The latter includes an inclined conveyor housing structure 289, which has outer upright walls 290 and parallel inner upright walls 291 extending upwardly from an elongated oblong floor 292. The chute 288 terminates above a semi-circular portion 293 of the conveyor structure 289. The floor 292 is supported at its lower end by a fixed mounting plate 294 sustained by an upright post 295 adjacent one end of the plate. This end of plate 294 is provided with a lateral extension area 296 which carries an upright stud 297 upon which a belt idler pulley 298 is journaled. As appears in FIG. 22, the upright inner wall 291 of housing structure 289 terminates short of the end of the elongated oblong floor 292 in the zone of pulley 298, enabling a gravitational discharge from chute 288 onto the floor at this extension area.

Adjacent its opposite end, the inclined plate 294 is supported from a fixed mounting bracket 300 through the agency of an arm 301 bolted to that bracket; and bolts 302 extend through the arm 301 and take into the lower side of plate 294, as shown in FIG. 23. The space between plate 294 and arm 301 is occupied by an adjustable slide 304, which on its outer left-hand end carries the assembly of motor 34 and speed reducer 35. The slide 304 is apertured at 306 to receive the bolts 302; and carries at an end thereof a depending lug 307. This lug is engaged by an adjusting screw 308 threaded in a depending bracket 309 on the bottom of mounting plate 294, the screw being equipped with a hand piece 310 for actuation, and with an adjustable stop nut 311 on one side of bracket 309.

These provisions constitute an adjustable belt tensioning unit, it will be perceived, in that manipulation of hand piece 310 enables the longitudinal adjustment of the slide plate 304 in one direction or another, once bolts 302 are loosened, whereupon they are taken up to lock the slide 304 and the motor-reducer assembly 34, 35 carried thereby in desired position. The shaft of speed reducer 35 extends upwardly through the conveyor floor 292 between the inner upright walls 291 of conveyor housing 289, where it has a belt driving pulley 313 fixed thereon.

An upright conveyor belt 315 is disposed for sliding engagement along the inner upright housing walls 291. This belt is trained at its ends about the driving and idler pulleys 313, 298, respectively; and is provided with a plurality of outwardly extending, upright pusher members or cleats 316 which project into scraping engagement with the outer upright walls 290 of the inclined housing. For the purpose of protecting against the entry of discharged material, the longitudinal, center zone of housing 289 is covered by a removable closure plate 318 releasably secured to upright posts 319 by wing nuts 320, and equipped with handles 321 for convenience in removing and replacing the closure plate.

Thus, as trim-off material falls onto the lower trough member 288 of trim conveyor 33, the material gravitates onto the extension of floor 292 of the conveyor in this end zone, is progressively picked up by the belt pushers or cleats 316, is swept along the conveyor housing between the walls 290, 291 in the direction indicated by arrow, and is at the upper end of the housing discharged off the lip 318 of floor 292 onto a downwardly inclined chute 319. This chute, as illustrated in FIGS. 1, 5 and 6, discharges gravitationally to the cascade-type supply mechanism 30, i.e., on the first vibratory trough or receptacle 103 of that unit. It is possible to discharge this trim-off material directly to the trough 103, without substantially disturbing the action of the latter, because of the relatively small quantity of this material.

On the other hand, funnel-dumped material should be returned by conveyor 37 to the original hopper 31, because of its comparatively large mass. As indicated above, structural features of the discharge or dump return conveyor 37 are similar to those of the trim conveyor 33 described above and may be observed in FIGS. 2 and 3 of the drawings, in which they are designated by reference numerals, primed, corresponding to those employed in FIGS. 22 and 23.

Commutation and Circuitry

The wiring diagram of FIG. 24b shows the fixed commutator plate 81 of FIG. 4 as being equipped with concentric arcuate conducting rings or segments conductively contacted by rotary brushes 71. These rings or segments include, in progression outwardly from the axis of commutator plate 81, a grounded circular conducting ring 330 contacted by a rotating brush 71 to which a chassis ground lead 331 is connected; a ring 332 connected by a lead 333 with an A.C. power supply lead 334, with a brush 71 also contacting rings 332 and having a return A.C. lead 335 connected thereto; a ring 336 connected by a lead 337 to a second or A.C. power input lead 338, with an output lead 339 connected to a rotary brush 71 slidingly contacting ring 336; a short arcuate segment 340 connected by a lead 341 with the power input lead 338, which segment 340 slidingly contacts a brush wired to a lead 342; an arcuate conducting segment 343 of major arcuate extent supplied from line 338 by a lead 344 through certain fuse and power limiting means, and with a brush 71 connected to a lead 345 for the take-off of current from segment 343; a short arcuate segment 346 supplied from line 338 by a lead 347 and periodically contacted by a brush whose output is through lead 348; a further short arcuate segment 350 the same radial distance from the commutator axis as the segment 346, which is supplied from line 338 by a lead 351 and is also adapted to energize the brush last referred to; and an arcuate segment 352 connected to lead 353, along with a further segment 354 and connected lead containing a relay 355, the segments 352 and 354 being engageable with a brush carrying a lead 356.

The brush lead 339 is one supplying voltage, via a relay 361, through the scale beam conductor 185 (FIG. 12) on scale beam 170 when that conductor is in engagement with the lower conducting contact 187, i.e., with an overweight of material remaining in the receptacle unit 23 and to be dribble fed off its vibratory tray 28. The circuit in question is completed through the lead 335. In this event, energization of the relay 361 in this circuit closes the contact 361' of that relay which is in the circuit of the lead 345. This causes energization of the vibratory feed-off or trim electromagnets 151, 152 to initiate and continue the vibration of feed-off tray 28 to progressively reduce the weight of the total receptacle content until the scale beam reaches balance, at which time relay 361 de-energizes and feed-off ceases.

Commutator segment 350, via the brush lead 348, is one supplying voltage through a relay 363 and the scale beam conductor 185 (FIG. 12) on scale beam 170 when that conductor is in engagement with the upper conducting, underweight contact 186. This takes place with an underweight charge in the receptacle unit 23 when it reaches the checkweighing area. The circuit in question is completed through the lead 335. In this event, energization of the relay 363 in this circuit closes the contact 363''' for the purpose of rejection of the underweight charge as described later.

The brush lead 339 is also employed in conjunction with the brush lead 356, and certain contacts 361''' and 363''' of relays 361 and 363, for the purpose of transmitting, through commutator segment 354, signals from relays 361 and 363 in the event scale beam conductor 185 engages either the lower or the upper contacts 187, 186, indicating an incorrect load at the overweight-underweight check point. This involves energization of the relay 355 connected to segment 354, closing the relay contacts 355', 355'' in the circuit of memory solenoid 59. The limit switch 66 is then duly closed by the pin 64 of the memory device. The unit, generally designated 381, in the wiring diagram of FIG. 24, is actually a part of the box set-up machine 12. It includes a valve-operating solenoid 383 connected in series with the limit switch 66, which solenoid, upon energization causes the machine 12 to fail to erect a carton and discharge the same to its conveyor 13. Accordingly, after the period it takes for the overweight or underweight filled funnel 22 to reach the discharge opening 25' in dead plate 25, there will be an absence of a set-up carton C beneath this opening, and the overweight or underweight funnel content will gravitate to the dump return conveyor 37, as described above.

The lead 335 also, in combination with lead 342, serves the purpose of controlling energization of the zeroing motor 175 in one rotative direction or another after the weighed load has been dumped, thus to adjust the eccentric tare weight 177. It does this through normally open and closed motor control contacts 363', 363'' of relay 363 in the circuit of lead 348, which relay is cut in from the short commutator segment 346 through lead 348. This takes place in the event that, with the tare weight 177 (FIG. 12) adjusted, the scale beam 170 reflects an underweight imposed by the empty receptacle when the scale beam unit is checked for zeroing i.e., with the scale beam conductor engaging the upper conductor contact 186.

Commutator segment 346, via brush lead 348, is one supplying voltage through relay 363 and the scale beam conductor 185 when that conductor is in engagement with the upper conducting contact 186, i.e., with an underweight of the receptacle unit 23, as after cleaning, with the unit discharged and masterweight 193 having been lifted from beam 170. The circuit in question is completed through the lead 335. In this event, energization of the relay 363 in this circuit closes the contact 363' of that relay which is in the circuit of the lead 342. This causes energization of the zeroing motor 175 through lead 335 in a rotative direction such as to reduce the taring of the scale beam by tare weight 177 and bring it into balance with the receptacle unit 23.

Conversely, if the scale beam conductor 185 (FIG. 12) is not in engagement with the upper conducting contact 186, i.e., with an overweight of the receptacle unit 23, as after a build-up of grease, salt or flavoring on the walls thereof, and with unit 23 discharged and uncounterpoised by masterweight 193, then relay 363 is not energized and consequently contact 363'' of that relay is closed. This causes energization of the zeroing motor 175 through leads 342 and 335 in a rotative direction such as to increase the taring of the scale beam 170 and bring it into balance with the receptacle unit 23.

FIG. 24 shows the vibrator 101 for the first supply trough 103 of the cascaded material supply mechanism 30 (FIGS. 5 and 6) as being supplied through a circuit including the manual adjusting rheostat 367. A vibrator 369 for the overhead hopper 31 and the carton feed rail vibrator 253 shown in FIGS. 15 and 18 are similarly supplied through manual rheostats 371, 372, respectively. The energization of these trough, hopper and rail vibratory provisions referred to is continuous following commencement of operation of the machine.

A relay 374 is provided whose energization is controlled by the weight-responsive scale beam 113 of the second vibratory trough 107 (FIGS. 5 and 6) through the limit switch 124 of that trough unit, as appears in FIG. 24. Relay 374 has its normally open contact 374' connected in series in the supply circuit for the first trough vibrator 101. With contact 374' open, vibrator 101 is supplied through a resistor R, causing a normal vibration of the first trough vibrator 101 at a given relatively "low" rate. However, closure of contact 374' upon a signal from limit switch 124 indicating that such rate is insufficient has the effect of shorting out the resistor R, causing trough 103 to be vibrated at its "high" rate until the deficiency is corrected. At such time, relay 374 is de-energized upon opening of limit switch 124 and the vibration rate of trough 103 returns to normal.

Similarly, a relay 375, controlled through the limit switch 124' of the third or final trough 127, has a normally open contact 375' in the circuit of the vibrator 110 for the second trough 102. A resistor R' is normally in the circuit of vibrator 110, but is shorted out upon closure of the limit switch 124', thus to energize the relay 375. As in the case of the first pan vibrator 101, the second pan vibrator 110 is driven at a higher rate upon closure of contact 375' to supply more material to the third trough 127. However, as above indicated, this adjustment is supplemented by a further range adjusting action performed by the rheostat and servo motor unit 128, shown in FIG. 7 (and also schematically depicted in FIG. 24).

Thus, as relay 375 is energized and de-energized to close and open the contact 375' further normally open and closed contacts 375" and 375'" thereof will respond to energize the servo motor 129 in one direction or the other, with resultant adjustment of the rheostat 132, which adjusts the top and bottom limits of the range of vibratory rate of the second trough vibrator 110.

For example, if the signal is such as to arbitrarily increase the vibration and discharge rate of the second trough 107 by shorting out resistor R' and stepping up its vibrator 110, the motor 129 will drive rheostat 132 in a direction to remove resistance from the circuit of vibrator 110. The same occurs in reverse upon forwarding of a "decrease feed" signal from the scale beam unit 112' of the third vibratory trough 127. A hunting action takes place which enables the vibrator 110 to continue at all times to satisfactorily and smoothly answer the demands of the third vibratory trough 127.

The rate of energization of the vibrator 110' for the third trough 127 is periodically checked and regulated through its rheostat and servo motor unit 128' at a check point about half way through the weighing and vibratory trim or feed-off cycle. To this end, another relay 377 (FIG. 24) is energized periodically through the sliding contact of one of the rotary brushes 71 with commutator segment 352, to which the relay 377 is connected by the lead 353. Commutator segment 352 is of an arc length in degrees equal to the arcuate extent of one of the weighing head units 138. Thus the brushes 71 traveling with such units consecutively contact this segment one at a time. As indicated, this occurs at about the midpoint of the period during which the small feed-off tray 28 of the receptacle unit 23 is being vibrated in travel.

If trimming action by tray 28 on the receptacle at this particular check time has not been completed, as indicated by the continued energization of relay 361, a circuit will be completed through relay contacts 361" and lead 356, causing energization of relay 377. This energization causes closure of relay contact 377', which results in energization of the servo motor 129' of unit 128' to adjust the rheostat 132' in the circuit of the vibrator for the third feed trough 127 in a direction to increase the resistance of rheostat 132', thereby reducing the rate of vibration of vibrator 110'.

If trimming action by tray 28 at this check time has been completed, relay 377 will not be energized causing relay contact 377" to be closed, which results in energization of the servo motor 129' in the opposite direction. A decrease in resistance of rheostat 132', results in an increased vibration rate of vibrator 110'. As in the case of the second trough's rheostat-servo motor unit 128, there results a continuously, hunting type of regulation of the vibrational rate of the third trough vibrator 110', which smoothly adjusts the density of feed of material from the third trough 127 to the receptacle unit 23 in a manner to maintain the latter at proper weight at the check point.

As indicated, during the period of time after closure of limit switch 66 the funnel 22 containing the overweight or underweight charge has a substantial length of sliding engagement with the dead plate 25 before reaching the dump opening in the latter.

For the rest, the circuitry shown in the wiring diagram of FIG. 24 includes a three-phase line supplying the motors 34, 34' of the respective trim return and dump return conveyors 33, 37; and a motor 385 to drive a blower, not shown, by which filtered air is forced upwardly through the fixed tubular shaft 73 (FIG. 4) and radially outwardly past the several scale beam units 93, as well as heating coil provisions 386 to heat such air, if desired. A transformer 387 effects the desired step down of the voltage to proper value for the needs of the machine 10, per se.

Conventional manual and automatic switches and relays, other than those referred to above, appear in FIG. 24, as well as needed capacitor, fuse and rectifier provisions, and the like. Such are shown, but not specifically identified by reference numerals or described, since it is only believed necessary in this respect to touch upon the components involved in the basic operating cycle of machine 10. As to such undesignated parts, their functional and structural relationship to the others will be apparent to those skilled in the art. It is to be understood that there are certain interconnected push buttons or gang connecting means 389 connecting the circuitry of FIG. 24 with that of the carton set-up machine 12 (not shown), just as the circuitry of the valve solenoid 383 is connected with that of machine 10. However, detailed explanation of the further coordinated electrical energization of the machines 10, 12 is not necessary to the present purpose, and would unduly expand the present description.

It is to be understood that the lower portion of the circuitry appearing in FIG. 24B, and specially designated 391, together with the commutator brushes 71 thereof, is repeated for each of the weigher head assemblies 138.

As has been mentioned above, the zeroing action of the motor-operated eccentric weight 177 is primarily for the purpose of periodically correcting the balance of the empty receptacle unit 23. However, contacts, relays and connections involved in this correction are also involved in the checkweighing for underweight phase. Thus, assuming a loss of force by the scale beam spring 215, due possibly to taking a set or to fatigue, then the weight of the receptacle unit necessary to separate the scale beam conductor 185 from the upper contact 186 would be diminished. The effect is the same as if there were an underweight charge in the receptacle, such underweight charge being sufficient to separate conductor 185 from contact 186, hence that such charge would be packaged. However, the effect repeats itself in the zeroing phase, whereupon an adjustment of eccentric tare weight 177 will increase the bias on the beam tending to engage conductor 185 with upper contact 186, thus automatically correcting for the loss of force in spring 215. A similar correction automatically compensates out errors which may arise due to increased electrical resistance at contact points, build-up of metal on the latter, variation in relay performance, and the like.

*Operation*

With the overhead supply hopper 31 appropriately filled, preferably by automatic means, not shown, the operation of the machine 10 is initiated. This includes the continuous activation of the trim and dump return conveyors 33, 37 and the continuous drive of the circular casting 69 (FIG. 4), upon cantilever or spider arms 72 of which the respective receptacle and scale beam units or devices 138 are carried, along with associated funnels 22 and pusher fingers 270. The latter receive erected cartons C from the conveyor of set-up machine 12, forwarding such cartons in a manner clearly and fully described above in connection with FIGS. 15 through 23 of the drawings.

Assuming that a weighing receptacle unit has been dumped into a funnel 22 well prior to the arrival at the funnel dump zone corresponding to the position of the opening 25' of dead plate 25, a scale idling period takes place to enable the weighing receptacle 23 and its scale balance unit 93 to stabilize prior to the zeroing operation of the latter. This occupies a first 60° of the 360° cycle.

At this time, the cam surface 87 of plate cam 85 (FIGS. 4 and 12) becomes effective to lift the master weight 193 from scale beam 170, through the agency of the cam operated lever 204 and rod 197, or otherwise to cancel out the counterpoise effect of weight 193, involving, as shown herein, the shifting thereof from a position in which it is effective as a counterpoise on the beam to a different position in which it is not. With the scale beam 170 thus in theoretical balance as to the empty receptacle units 23, its conductor 185 will not, presumably, engage the upper contact 186 (FIGS. 12 and 24), due, for example, to the added weight of coating or like material adhering to the walls of the receptacle.

The result is that the zeroing motor 175 is energized to shift eccentric weight 177 (to the right in FIG. 12, counterclockwise in FIG. 11), thus adding compensating tare weight to scale beam 170 to offset the additional receptacle weight increment. Zeroing action of the motor 175 takes place over the next 5°, that is from 60° to 65° of the rotation cycle.

The receptacle unit now enters the loading phase of its cycle, lasting from about 65°–100° of the latter, in which the receptacle receives an overweight charge, as supplied thereto by the cascaded vibratory feed or supply mechanism of FIGS. 5 and 6. During the loading phase the master weight 193 is restored to the beam 170 following the zeroing phase. The overweight charge now causes closure of scale beam conductor 185 with the lower contact 187, initiating the vibrating action in trim receptacle 28. Unless earlier interrupted by departure of the scale beam conductor 185 from the lower contact 187 upon reaching proper weight, the phase of vibration of trim receptacle 28 would continue from 100° to 286° of the cycle, being interrupted between 286° and 310°, during which the dump of a weighed receptacle charge into a funnel 22 commences.

During the trim-off phase in question, the cascaded feed device 30 is continuously subject to the variable control of its three successive troughs 103, 107 and 127 (FIGS. 5 and 6) not only as to arbitrary "high"-"low" alterations in response to scale beam control of the respective limit switches 124, 124', as described, but also in regard to up and down overall range variation of the second trough vibrator 110 (in response to signal from the third scale beam unit 112 of mechanism 30) and of the third vibrator 110' (in response to commutation signal as described). These actions, by which an automatic smoothing of the flow of material from hopper 31 along the cascade device 30 is made possible, and the controlled density of feed to the receptacle unit 23, occupy an 180°–204° phase of the rotative cycle.

Check weighing for overweight and underweight of the receptacle unit 23 occurs at the end of its theoretically possible vibratory phase, for example from 276° to 280° of the cycle. In the event of either overweight or underweight, a signal is transmitted through the receptacle's scale beam conductor to the memory solenoid 59 (FIGS. 4 and 24), upon closure of the circuit of this solenoid due to energization of relay 377. There follows a closure of limit switch 66 and energization of the valve solenoid 383 of the set-up machine 12; with the result that no set-up carton C is forwarded by a pusher finger 270 to the dump zone at the time that the overweight or underweight funnel discharge arrives.

An overweight or underweight charge falls to the dump return conveyor 37, by which it is returned upwardly to the overhead bin or hopper 31. Material trimmed off the trays 28 is similarly returned to the supply means, but in this case to the first vibratory trough 103 thereof, by the conveyor structure 33 of FIGS. 22 and 23, which the dump return conveyor closely resembles.

The machine 10, as operated in conjunction with the carton set-up machine 12, is characterized by a continuous, rapid and high output production, in which there is assured a very accurate weighing to a desired value of the contents of each of a number of rotative receptacle units, of which there may be, say, fifteen arranged in circumferentially spaced relation to one another. There is no possibility of the boxing of an overweight or underweight charge, since both are dumped by the funnel 22 without entering a carton. Accurate compensation is made against the gradual build-up of a residue of balance-disturbing weight due to coating or like materials adhering to the receptacle walls, or other mechanical effects, further insuring against accruing error. Furthermore, provision is made for the receptacle units to receive an overhead supply of material which is gradually controlled as to density, thus diminishing the amount of vibration to which a tray must be subjected in order to reach proper receptacle weight; although an extensive vibratory phase is provided for, in any event. In all of these respects, and particularly in further respect to the vibratory feed-off principle upon which the operation of the machine 10 is based, it is considered significantly superior to known weighing machines presently or in the past employed by the trade.

What we claim as our invention is:

1. In a weighing machine having a traveling material receiving and discharging receptacle subject to increase in weight by substance adhering thereto after discharge of its normal content, counterpoise means to weigh the receptacle and content in travel, means to effect a discharge of said content from the receptacle in a desired ultimate weight determined by said counterpoise means, and means automatically acting on said counterpoise means after said discharge of said content from said receptacle under control of said discharge means to adjust said counterpoise means to compensate for the increased receptacle weight due to adhered substance.

2. In a weighing machine having a traveling material receiving and discharging receptacle subject to increase in weight by substance adhering thereto after discharge of its normal content, counterpoise means traveling with and supporting the receptacle to weigh the receptacle and content in travel, means to effect a discharge of said content from the receptacle in a desired ultimate weight determined by said counterpoise means, and means automatically acting on said counterpoise means during said travel and after said discharge of said content from said receptacle under control of said discharge means to adjust said counterpoise means to compensate for the increased receptacle weight due to adhered substance.

3. In a weighing machine having a traveling material receiving and discharging receptacle subject to increase in weight by substance adhering thereto after discharge of its normal content, counterpoise means traveling with and supporting the receptacle to weigh the receptacle and content in travel, means to effect a discharge of said content from the receptacle in a desired ultimate weight determined by said counterpoise means, and means automatically acting on said counterpoise means during said travel and after said discharge of said content from said receptacle under control of said discharge means to adjust said counterpoise means to compensate for the increased receptacle weight due to adhered substance, said adjusting means comprising a master weight normally carried by said counterpoise means and exerting on the latter an effect to balance said content alone.

4. In a weighing machine having a traveling material receiving and discharging receptacle subject to increase in weight by substance adhering thereto after discharge of its normal content, counterpoise means traveling with and supporting the receptacle to weigh the receptacle and content in travel, means to effect a discharge of said content from the receptacle in a desired ultimate weight determined by said counterpoise means, and means automatically acting on said counterpoise means during said travel and after said discharge of said content from said receptacle under control of said discharge means to adjust said counterpoise means to compensate for the increased receptacle weight due to adhered substance, said adjusting means comprising a master weight normally exerting on said counterpoise means an effect to balance said content alone, and means acting on said master weight during travel to relieve said counterpoise means of said effect, said automatic means making said compensating adjustment when said counterpoise means is so relieved.

5. Weighing apparatus comprising a series of material containing receptacles driven for travel in an endless path, means acting on each receptacle in its travel to alter the weight of its content to a desired value, counterpoise-balanced means supporting the receptacles and the content thereof in travel and operative on said first named means to terminate the weight altering action thereof when the desired weight in any given receptacle is reached in travel, means to empty said receptacles of the weighed content thereof to the extent that the latter is normally dischargeable, said counterpoise-balanced means including master weight means effective thereon to balance the desired weight alone of the receptacle content, means acting on said counterpoise-balanced means after said emptying of the receptacle content by said receptacle means to render said master weight means ineffective, and means altering the tare of said counterpoise-balanced means to balance the weight of the receptacle plus residue of its content not discharged in emptying.

6. Weighing apparatus comprising a series of material containing receptacles driven for travel in an endless path, vibratory means acting on each receptacle in its travel to reduce the weight of its content to a desired value, counterpoise-balanced means for each receptacle supporting the receptacle and the content thereof in travel and operative on said vibratory means to terminate the weight reducing action thereof when the desired weight in any given receptacle is reached in travel, means to empty said receptacles of the weighed content thereof to the extent that the latter is normally dischargeable, said counterpoise-balanced means including tare means effective to balance the weight of the receptacle, and means acting on said counterpoise-balanced means after said emptying of the receptacle content to adjust said tare means to compensate for the weight of a residue of material in the receptacle not normally discharged in the emptying of the receptacle.

7. Weighing apparatus comprising a series of material containing receptacles driven for travel in an endless path, vibratory means acting on each receptacle in its travel to reduce the weight of its content to a desired value, counterpoise-balanced means for each receptacle supporting the receptacle and the content thereof in travel and operative on said vibratory means to terminate the weight reducing action thereof when the desired weight in any given receptacle is reached in travel, means to empty said receptacles of the weighed content thereof to the extent that the latter is normally dischargeable, said counterpoise-balanced means including tare means effective to balance the weight of the receptacle, means acting on said counterpoise-balanced means after said emptying of the receptacle content to adjust said tare means to compensate for the weight of a residue of material in the receptacle not normally discharged in the emptying of the receptacle, and means operatively connected to said last named means and responsive to the latter when said tare means is ineffective to originate a signal reflective of the weight of the receptacle and residue.

8. Weighing apparatus comprising a series of material containing receptacles driven for travel in an endless path, vibratory means acting on each receptacle in its travel to reduce the weight of its content to a desired value, counterpoise-balanced means for each receptacle supporting the receptacle and the content thereof in travel and operative on said vibratory means to terminate the weight reducing action thereof when the desired weight in any given receptacle is reached in travel, means to empty said receptacles of the weighed content thereof to the extent that the latter is normally dischargeable, said counterpoise-balanced means including tare means effective to balance the weight of the receptacle, means acting on said counterpoise-balanced means after said emptying of the receptacle content to render to said tare means to compensate for the weight of a residue of material in the receptacle not normally discharged in the emptying of the receptacle, means operatively connected to said last named means and responsive to the latter when said tare means is ineffective to originate a signal reflective of the weight of the receptacle and residue, and means operative in response to said last named signal to correct the counterpoise effect on said balanced means to compensate for the effect of said residue.

9. A weighing machine comprising a material containing and weighing receptacle unit driven for endless travel and comprising a material receiving and weighing receptacle having means to vary the weight of its material content during travel until a desired weight of content of the receptacle is reached, and a pivoted and counterpoised scale beam supporting said receptacle in travel and having means operatively connecting the beam to said weight varying means to terminate the operation of the latter when said desired weight is reached, and means to thereupon effect a discharge of the weighed content of the receptacle, said scale beam having a master weight removably mounted thereon and normally counterbalancing the desired weight of receptacle content, and means automatically operative following discharge of the weighed content to compensate the counterpoising of said scale beam to exactly balance the empty receptacle supported thereby.

10. A weighing machine comprising a material containing and weighing receptacle unit driven for endless travel and comprising a material receiving and weighing receptacle having means to vibrate at least a part thereof during travel to feed off material therefrom until a desired weight of content of the receptacle is reached, and a pivoted and counterpoised scale beam supporting said receptacle in travel and having means operatively connecting the beam to said vibratory discharge means to terminate the operation of the latter when said desired weight is reached, and means to thereupon discharge the weighed content of the receptacle, said scale beam having a master weight variably positionable relative thereto so as to be effective in normally counterbalancing the desired weight of receptacle content of the receptacle under control of said discharge means, and so as not to be thus effective, and means automatically operative following discharge of the weighed content to position said master weight to be ineffective and to compensate the counterpoising of said scale beam to exactly balance the empty receptacle supported thereby.

11. A weighing machine comprising a material containing and weighing receptacle unit driven for endless travel and comprising a material receiving and weighing receptacle having means to vibrate at least a part thereof during travel to feed off material therefrom until a desired weight of content of the receptacle is reached, and a pivoted and counterpoised scale beam supporting said receptacle in travel and having means operatively connecting the beam to said vibratory discharge means to terminate the operation of the latter when said desired weight is reached, and means to thereupon discharge the weighed content of the receptacle, said scale beam having a master weight removably mounted thereon and normally counterbalancing the desired weight of receptacle content, and means automatically operative following discharge of the weighed content to compensate the counterpoising of said scale beam to exactly balance the empty receptacle supported thereby, said last named means including a counterweight mounted on said scale beam for adjusting movement thereon, means for temporarily removing said master weight from the scale beam, and means to adjust said counterweight with said master weight thus removed.

12. A weighing machine comprising a material containing and weighing receptacle unit driven for endless travel and comprising a material receiving and weighing receptacle having means to vibrate at least a part thereof during travel to feed off material therefrom until a desired weight of content of the receptacle is reached, and a pivoted and counterpoised scale beam supporting said receptacle in travel and having means operatively connecting the beam to said vibratory discharge means to terminate the operation of the latter when said desired weight is reached, and means to thereupon discharge the weighed content of the receptacle, said scale beam having a master weight removably mounted thereon and normally counterbalancing the desired weight of receptacle content, and means automatically operative following discharge of the weighed content to compensate the counterpoising of said scale beam to exactly balance the empty receptacle supported thereby, said last named means including a counterweight mounted on said scale beam for adjusting movement thereon, means for temporarily removing said master weight from the scale beam, and means to adjust said counterweight with said master weight thus removed, said adjusting means comprising an electrical motor on the scale beam operatively connected to said counterweight to adjusably move the latter, and electrical circuitry wired to said motor and including a conductor on said scale beam through which current is conducted to energize said motor and adjust said counterweight when said master weight is removed from the beam.

13. A weighing receptacle device for a weighing machine of the type described, comprising a material containing receptacle having means to discharge the same periodically of a predetermined weight of content and a pivoted and counterpoised scale beam supporting said receptacle for weighing prior to said discharge, said scale beam having a master weight removably mounted thereon and normally counterbalancing the desired weight of receptacle content, and means automatically operative following discharge of the weight content of said receptacle under control of said discharge means and removal of said master tare weight from the beam to compensate the counterposing of said scale beam to exactly balance the empty receptacle supported thereby.

14. A weighing receptacle device for a weighing machine of the type described, comprising a material containing receptacle having means to discharge the same periodically of a predetermined weight of content and a pivoted and counterpoised scale beam supporting said receptacle for weighing prior to said discharge, said scale beam having a master weight removably mounted therein and normally counterbalancing the desired weight of receptacle content, and means automatically operative following discharge of the weighed content of said receptacle under control of said discharge means to compensate the counterpoising of said scale beam to exactly balance the emtpy receptacle supported thereby, said last named means including a counterweight mounted on said scale beam for adjusting movement thereon, means for temporarily removing said master weight from the scale beam, and means to adjust said counterweight with said master weight thus removed.

15. A weighing receptacle device for a weighing machine of the type described, comprising a material containing receptacle adapted to be periodically discharged of a predetermined weight of content and a pivoted and counterpoised scale beam supporting said receptacle for weighing prior to said discharge, said scale beam having a master weight removably mounted thereon and normally counterbalancing the desired weight of receptacle content, and means automatically operative following discharge of the weighed content to compensate the counterpoising of said scale beam to exactly balance the empty receptacle supported thereby, said last named means including a counterweight mounted on said scale beam for adjusting movement thereon, means for temporarily removing said master weight from the scale beam, and means to adjust said counterweight with said master weight thus removed, said adjusting means comprising an electrical motor on the scale beam operatively connected to said counterweight to adjustably move the latter, and electrical circuitry wired to said motor and including a conductor on said scale beam through which current is conducted to energize said motor and adjust said counterweight when said master weight is removed from the beam.

16. A weighing machine comprising a plurality of material receiving and weighing units having means to advance the same for travel in succession through a continuous path, each unit including a material receiving receptacle having means to alter the weight of the content thereof during travel to a desired value, a counterpoised scale beam supporting and weighing each receptacle and its content during travel and having means operatively connected to the receptacle's weight altering means to terminate operation thereof when the desired weight value is reached, means to then discharge the weighed content of the receptacle, and means acting after said discharge to adjustably compensate the counterpoising of said scale means to balance the weight of the receptacle alone after discharge; and material supply means past which said receptacles travel, said last named means supplying an initial charge to each of the traveling receptacles and including a series of vibratory supply members progressively discharging material from one thereof onto the next, thence from the last onto a receptacle passing said material supply means, at least one of said members being counterpoised and having means responsive to the weight of material thereon and operatively connected to the member discharging thereto to adjust the rate of vibration of the latter, said one member being operatively connected to a further member to which it discharges and being controlled by the latter to adjust its own rate of vibration.

17. A weighing machine comprising a plurality of material receiving and weighing units having means to advance the same for travel in succession through a continuous path, each unit including a material receiving receptacle having means to alter the weight of the content thereof during travel to a desired value, a counterpoised scale beam supporting and weighing each receptacle and its content during travel and having means operatively connected to the receptacle's weight altering means to terminate operation thereof when the desired weight value is reached, means to then discharge the weighed content of the receptacle, and means acting after said discharge to adjustably compensate the counterpoising of said scale means to balance the weight of the receptacle alone after discharge; and material supply means past which said receptacles travel, said last named means supplying an initial charge to each of the traveling receptacles and including a series of vibratory supply members progressively discharging material from one thereof onto the next, thence from the last onto a receptacle passing said material supply means, at least one of said members being counterpoised and having means responsive to the weight of material thereon and operatively connected to the member discharging thereto to adjust the rate of vibration of the latter, said one member being operatively connected to a further member to which it discharges and being controlled by the latter to adjust its own rate of vibration, and means operative concurrently with the adjustment of the rate of vibration of said one member to adjust the limits of its vibratory rate range.

18. A weighing machine comprising a plurality of material receiving and weighing units having means to advance the same for travel in succession through a continuous path, each unit including a material receiving receptacle having means to alter the weight of the content thereof during travel to a desired value, a counterpoised scale beam supporting and weighing each receptacle and its content during travel and having means operatively connected to the receptacle's weight altering means to terminate operation thereof when the desired weight value is reached, means to then discharge the weighed content of the receptacle, and means acting after said discharge to adjustably compensate the counterpoising of said scale means to balance the weight of the receptacle alone after discharge; and material supply means past which said receptacles travel, said last named means supplying an initial charge to each of the traveling receptacles and including a series of vibratory supply members progressively discharging material from one thereof onto the next, thence from the last onto a receptacle passing said material supply means, at least one of said members being counterpoised and having means responsive to the weight of material thereon and operatively connected to the member discharging thereto to adjust the rate of vibration of the latter, said one member being operatively connected to a further member to which it discharges and being controlled by the latter to adjust its own rate of vibration, and means responsive to signal from a scale beam during the weighing of its receptacle in travel to adjust the vibratory rate and discharge of the last supply member of the series.

19. A weighing machine comprising a plurality of material receiving and weighing units having means to advance the same for travel in succession through a continuous path, each unit including a material receiving receptacle having means to alter the weight of the content thereof during travel to a desired value, a counterpoised scale beam supporting and weighing each receptacle and its content during travel and having means operatively connected to the receptacle's weight altering means to terminate operation thereof when the desired weight value is reached, means to then discharge the weighed content of the receptacle, and means acting after said discharge to adjustably compensate the counterpoising of said scale means to balance the weight of the receptacle alone after discharge; and material supply means past which said receptacles travel, said last named means supplying an initial charge to each of the traveling receptacles and including a series of vibratory supply members progressively discharging material from one thereof onto the next, thence from the last onto a receptacle passing said material supply means, at least one of said members being counterpoised and having means responsive to the weight of material thereon and operatively connected to the member discharging thereto to adjust the rate of vibration of the latter, said one member being operatively connected to a further member to which it discharges and being controlled by the latter to adjust its own rate of vibration, means operative concurrently with the adjustment of the rate of vibration of said one member to adjust the limits of its vibratory rate range, and means responsive to signal from a scale beam during the weighing of its receptacle in travel to adjust the vibratory rate and discharge of the last supply member of the series.

20. A weighing machine comprising a plurality of material receiving and weighing units having means to advance the same for travel in succession through a continuous path, each unit including a material receiving receptacle having means to alter the weight of the content thereof during travel to a desired value, a counterpoised scale beam supporting and weighing each receptacle and its content during travel and having means operatively connected to the receptacle's weight altering means to terminate operation thereof when the desired weight value is reached, means to then discharge the weighed content of the receptacle, and means acting after said discharge to adjustably compensate the counterpoising of said scale means to balance the weight of the receptacle alone after discharge; material supply means past which said receptacles travel, said last named means supplying an initial charge to each of the traveling receptacles and including a series of vibratory supply members progressively discharging material from one thereof onto the next, thence from the last onto a receptacle passing said material supply means, at least one of said members being counterpoised and having means responsive to the weight of material thereon and operatively connected to the member discharging thereto to adjust the rate of vibration of the latter, said one member being operatively connected to a further member to which it discharges and being controlled by the latter to adjust its own rate of vibration; and overweight and underweight check means controlled by the scale beam of each material receiving and weighing unit, after weighing and before discharge in travel of the content of the receptacle thereof, to initiate a signal indicative of an undesired overweight or underweight content.

21. A weighing machine comprising a plurality of material receiving and weighing units having means to advance the same for travel in succession through a continuous path, each unit including a material receiving receptacle having means to alter the weight of the content thereof during travel to a desired value, a counterpoised scale beam supporting and weighing each receptacle and its content during travel and having means operatively connected to the receptacle's weight altering means to terminate operation thereof when the desired weight value is reached, means to then discharge the weighed content of the receptacle, and means acting after said discharge to adjustably compensate the counterpoising of said scale means to balance the weight of the receptacle alone after discharge; material supply means past which said receptacles travel, said last named means supplying an inititl charge to each of the traveling receptacles and including a series of vibratory supply members progressively discharging material from one thereof onto the next, thence from the last onto a receptacle passing said material supply means, at least one of said members being counterpoised and having means responsive to the weight of material thereon and operatively connected to the member discharging thereto to adjust the rate of vibration of the latter, said one member being operatively connected to a further member to which it discharges and being controlled by the latter to adjust its own rate of vibration, means operative concurrently with the adjustment of the rate of vibration of said one member to adjust the limits of its vibratory rate range, and means responsive to signal from a scale beam during the weighing of its receptacle in travel to adjust the vibratory rate and discharge of the last supply member of the series; and overweight and underweight check means controlled by the scale beam of each material receiving and weighing unit, after weighing and before discharge in travel of the content of the receptacle thereof, to initiate a signal indicative of an undesired overweight or underweight content, and means responsive to said signal to handle the disposition of such undesired content.

22. A weighing machine comprising a plurality of material receiving and weighing units having means to advance the same for travel in succession through a continuous path, each unit including a material receiving receptacle having means to vibrate at least a part thereof during travel for the feed off therefrom of a portion of an initial overweight charge, thus to reduce the weight of the receptacle content to a desired value, a counterpoised scale beam supporting and weighing each receptacle and its content during travel and having means operatively connected to the receptacle's vibrating means to terminate operation thereof when the desired weight value is reached, means to then discharge the weighed content of the receptacle; material supply means past which said receptacles travel, said last named means supplying an initial charge to each of the traveling receptacles; overweight and underweight check means controlled by the scale beam of each material receiving and weighing unit, after weighing and before discharge in travel of the content of the receptacle thereof, to initiate a signal indicative of an undesired overweight or underweight content, and means responsive to said signal to handle the disposition of such undesired content; and conveyors respectively receiving the thus disposed undesired content and the material fed off the receptacles by said receptacle vibrating means, said conveyors returning to said initial charge supply means the material thus received thereby.

23. A weighing machine comprising a plurality of material receiving and weighing units having means to advance the same for travel in succession through a continous path, each unit including a material receiving receptacle having means to vibrate at least a part thereof during travel for the feed off therefrom of a portion of an initial overweight charge, thus to reduce the weight of the receptacle content to a desired value, a counterpoised scale beam supporting and weighing each receptacle and its content during travel and having means operatively connected to the receptacle's vibrating means to terminate operation thereof when the desired weight value is reached, means to then discharge the weighed content of the receptacle, and means acting after said discharge to adjustably compensate the counterpoising of said scale means to balance the weight of the receptacle alone after discharge; material supply means past which said receptacles travel, said last named means supplying an initial charge to each of the traveling receptacles; overweight and underweight check means controlled by the scale beam of each material receiving and weighing unit, after weighing and before discharge in travel of the content of the receptacle thereof, to initiate a signal indicative of an undesired overweight or underweight content, and means responsive to said signal to handle the disposition of such undesired content; and conveyors respectively receiving the thus disposed undesired content and the material fed off the receptacles by said receptacle vibrating means, said conveyors returning to said initial charge supply means the material thus received thereby.

24. A weighing machine comprising a plurality of material receiving and weighing units having means to advance the same for travel in succession through a continuous path, each unit including a material receiving receptacle having means to vibrate at least a part thereof during travel for the feed off therefrom of a portion an initial overweight charge, thus to reduce the weight of the receptacle content to a desired value, a counterpoised scale beam supporting and weighing each receptacle and its content during travel and having means operatively connected to the receptacle's vibrating means to terminate operation thereof when the desired weight value is reached, and means to then discharge the weighed content of the receptacle; material supply means past which said receptacles travel, said last named means supplying an initial charge to each of the traveling receptacles and including a series of vibratory supply members progressively discharging material from one thereof onto the next, thence from the last onto a receptacle passing said material supply means; overweight and underweight check means controlled by the scale beam of each material receiving and weighing unit, after weighing and before discharge in travel of the content of the receptacle thereof, to initiate a signal indicative of an undesired overweight or underweight content, and means responsive to said signal to handle the disposition of such undesired content; and conveyors respectively receiving the thus disposed undesired content and the material fed off the receptacles by said receptacle vibrating means, said conveyors returning to said initial charge supply means the material thus received thereby.

25. A weighing machine comprising a plurality of material receiving and weighing units having means to advance the same for travel in succession through a continuous path, each unit including a material receiving receptacle having means to vibrate at least a part thereof during travel for the feed off therefrom of a portion of an initial overweight charge, thus to reduce the weight of the receptacle content to a desired value, a counterpoised scale beam supporting and weighing each receptacle and its content during travel and having means operatively connected to the receptacle's vibrating means to terminate operation thereof when the desired weight value is reached, and means to then discharge the weighed content of the receptacle; material supply means past which said receptacles travel, said last named means supplying an initial overweight charge to each of the traveling receptacles; overweight and underweight check means controlled by the scale beam of each material receiving and weighing unit, after weighing and before discharge in travel of the content of the receptacle thereof, to initiate a signal indicative of an undesired overweight or underweight content, and means responsive to said signal to handle the disposition of such undesired content; and a conveyor receiving the material fed off the receptacles by said receptacle vibrating means, said conveyor returning to said initial charge supply means the material thus received thereby.

26. A weighing machine comprising a plurality of material receiving and weighing units having means to advance the same for travel in succession through a continuous path, each unit including a material receiving receptacle having means to vibrate at least a part thereof during travel for the feed off therefrom of a portion of an initial overweight charge, thus to reduce the weight of the receptacle content to a desired value, a counterpoised scale beam supporting and weighing each receptacle and its content during travel and having means operatively connected to the receptacle's vibrating means to terminate operation thereof when the desired weight value is reached, and means to then discharge the weighed content of the receptacle; material supply means past which said receptatcles travel, said last named means supplying an initial overweight charge to each of the traveling receptacles; overweight and underweight check means controlled by the scale beam of each material receiving and weighing unit, after weighing and before discharge in travel of the content of the receptacle thereof, to initiate a signal indicative of an undesired overweight or underweight content, and means responsive to said signal to handle the disposition of such undesired content; and conveyors respectively receiving the thus disposed content and the material fed off the receptacles by said receptacle vibrating means, said conveyors returning to said initial charge supply means the material thus received thereby.

27. A weighing machine comprising a plurality of material receiving and weighing units having means to advance the same for travel in succession through a continuous path, each unit including a material receiving receptacle having means to alter the weight of the content thereof during travel to a desired value, a counterpoised scale beam supporting and weighing each receptacle and its content during travel and having means operatively connected to the receptacle's weight altering means to terminate operation thereof when the desired weight value is reached, means to then discharge the weighed content of the recepatcle, and means acting after said discharge to adjustably compensate the counterpoising of said scale means to balance the weight of the receptable alone after discharge; material supply means past which said receptacles travel, said last named means supplying an initial charge to each of the traveling receptacles and including a series of vibratory supply members progressively discharging material from one thereof onto the next, thence from the last onto a receptacle passing said material supply means; overweight and underweight check means controlled by the scale beam of each material receiving and weighing unit, after weighing and before discharge in travel of the content of the receptacle thereof, to initiate a signal indicative of an undesired overweight or underweight content, and means responsive to said signal to handle the disposition of such undesired content; and a conveyor receiving the thus disposed undesired content, said conveyor returning to said initial charge supply means the material thus received thereby.

28. A weighing machine comprising a plurality of material receiving and weighing units having means to advance the same for travel in succession through a continuous path, each unit including a material receiving receptacle having means to vibrate at least a part thereof during travel for the feed off therefrom of a portion of an initial overweight charge, thus to reduce the weight of the receptacle content to a desired value, a counterpoised scale beam supporting and weighing each receptacle and its content during travel and having means operatively connected to the receptacle's vibrating means to terminate operation thereof when the desired weight value is reached, means to then discharge the weighed content of the receptacle, and means acting after said discharge to adjustably compensate the counterpoising of said scale means to balance the weight of the receptacle alone after discharge; material supply means past which said receptacles travel, said last named means supplying an initial overweight charge to each of the traveling receptacles and including a series of vibratory supply members progressively discharging material from one thereof onto the next, thence from the last one a receptacle passing said material supply means, at least one of said members being counterpoised and having means responsive to the weight of material thereon and operatively connected to the member discharging thereto to adjust the rate of vibration of the latter; overweight and underweight check means controlled by the scale beam of each material receiving and weighing unit, after weighing and before discharge in travel of the content of the receptacle thereof, to initiate a signal indicative of an undesired overweight or underweight content, and means responsive to said signal to handle the disposition of such undesired content; and conveyors respectively receiving the thus disposed undesired content and the material fed off the receptacles by said receptacle vibratory means, said conveyors returning to said initial charge supply means the material thus received thereby.

29. A weighing machine comprising a plurality of material receiving and weighing units having means to advance the same for travel in succession through a continuous path, each unit including a material receiving receptacle having means to vibrate at least a part thereof during travel for the feed off therefrom of a portion of an initial overweight charge, thus to reduce the weight of the receptacle content to a desired value, a counterpoised scale beam supporting and weighing each receptacle and its content during travel and having means operatively connected to the receptacle's vibrating means to terminate operation thereof when the desired weight value is reached, means to then discharge the weighed content of the receptacle, and means acting after said discharge to adjustably compensate the counterpoising of said scale means to balance the weight of the receptacle alone after discharge; material supply means past which said receptacles travel, said last named means supplying an initial overweight charge to each of the traveling receptacles and including a series of vibratory supply members progressively discharging material from one thereof onto the next, thence from the last onto a receptacle passing said material supply means, at least one of said members being counterpoised and having means responsive to the weight of material thereon and operatively connected to the member discharging thereto to adjust the rate of vibration of the latter, said one member being operatively connected to a further member to which it discharges and being controlled by the latter to adjust its own rate of vibration, means operative concurrently with the adjustment of the rate of vibration of said one member to adjust the limits of its vibratory rate range, and means responsive to signal from a scale beam during the weighing of its receptacle in travel to adjust the vibratory rate and discharge of the last supply member of the series; overweight and underweight check means controlled by the scale beam of each material receiving and weighing unit, after weighing and before discharge in travel of the content of the receptacle thereof, to initiate a signal indicative of an undesired overweight or underweight content, and means responsive to said signal to handle the disposition of such undesired content; and conveyors respectively receiving the thus disposed undesired content and the material fed off the receptacles by said receptacle vibrating means, said conveyors returning to said initial charge supply means the material thus received thereby.

30. In a weighing machine characterized by a series of counterpoised material receiving and weighing units traveling an endless path and discharging the content thereof after weighing it, a device to supply to each of said units during travel a charge of material to be weighed, said device comprising a plurality of vibratory supply receptacles arranged in sequence to discharge one onto another, including a pair of counterpoised supply receptacles each having means operatively connecting it to a preceding vibratory supply receptacle to adjust the vibratory rate of the latter in response to the weight of material on the counterpoised receptacle in question.

31. In a weighing machine characterized by a series of counterpoised material receiving and weighing units traveling an endless path and discharging the content thereof after weighing it, a device to supply to each of said units during travel a charge of material to be weighed, said device comprising a plurality of vibratory supply receptacles arranged in sequence to discharge one onto another, including a pair of counterpoised supply receptacles each having means operatively connecting it to a preceding vibratory supply receptacle to adjust the vibratory rate of the latter in response to the weight of material on the counterpoised receptacle in question, said receptacle in question having means similarly responsive to the weight of material on a counterpoised supply receptacle following it to adjust the range of its own vibratory rates concurrently with the adjustment of its rate.

32. In a weighing machine characterized by a series of counterpoised material receiving and weighing units traveling an endless path and discharging the content thereof after weighing it, a device to supply to each of said units during travel a charge of material to be weighed, said device comprising a plurality of vibratory supply receptacles arranged in sequence to discharge one onto another, including a pair of counterpoised supply receptacles each having means operatively connecting it to a preceding vibratory supply receptacle to adjust the vibratory rate of the latter in response to the weight of material on the counterpoised receptacle in question, said receptacle in question having means similarly responsive to the weight of material on a counterpoised supply receptacle following it to adjust the range of its own vibratory rates concurrently with the adjustment of its rate, the final vibratory supply receptacle of the series having means responsive to signal from a counterpoised material receiving and weighing unit to adjust the rate of vibration of said final supply receptacle in accordance with the weight of the content of said unit.

33. In a weighing machine characterized by a series of counterpoised material receiving and weighing units traveling an endless path and discharging the content thereof after weighing it, a device to supply to each of said units during travel a charge of material to be weighed, said device comprising a plurality of vibratory supply receptacles arranged in sequence to discharge one onto another, including a pair of counterpoised supply receptacles each having means operatively connecting it to a preceding vibratory supply receptacle to adjust the vibratory rate of the latter in response to the weight of material on the counterpoised receptacle in question, the final vibratory supply receptacle of the series having means responsive to signal from a counterpoised material receiving and weighing unit to adjust the rate of vibration of said final supply receptacle in accordance with the weight of the content of said unit, said signal being originated during weighing of said content; and means operative in response to the weight of the content of each unit, and following completion of the weighing of said content and prior to discharge thereof, to initiate a signal indicative of an overweight or underweight content.

34. In a weighing machine characterized by a series of counterpoised material receiving and weighing units traveling an endless path and discharging the content thereof after weighing it, a device to supply to each of said units during travel a charge of material to be weighed, said device comprising a plurality of vibratory supply receptacles arranged in sequence to discharge one onto another, including a pair of counterpoised supply receptacles each having means operatively connecting it to a preceding vibratory supply receptacle to adjust the vibratory rate of the latter in response to the weight of the material on the counterpoised receptacle in question, said receptacle in question having means similarly responsive to the weight of material on a counterpoised supply receptacle following it to adjust the range of its own vibratory rates concurrently with the adjustment of its rate, the final vibratory supply receptacle of the series having means responsive to signal from a counterpoised material receiving and weighing unit to adjust the rate of vibration of said final supply receptacle in accordance with the weight of the content of said unit, said signal being originated during weighing of said content; and means operative in response to the weight of the content of each unit, and following completion of the weighing of said content and prior to discharge thereof, to initiate a signal indicative of an overweight or underweight content.

35. In a weighing machine characterized by a series of counterpoised material receiving and weighing units traveling an endless path and discharging the content thereof after weighing it, a device to supply to each of said units during travel a charge of material to be weighed, said device comprising a plurality of vibratory supply receptacles arranged in sequence to discharge one onto another, including a pair of counterpoised supply receptacles each having means operatively connecting it to a preceding vibratory supply receptacle to adjust the vibratory rate of the latter in response to the weight of material on the counterpoised receptacle in question, the final vibratory supply receptacle of the series having means responsive to signal from a counterpoised material receiving and weighing unit to adjust the rate of vibration of said final supply receptacle in accordance with the weight of the content of said unit, said signal being originated during weighing of said content; and means operative in response to the weight of the content of each unit, and following completion of the weighing of said content and prior to discharge thereof, to initiate a signal indicative of an overweight or underweight content, said weighing machine having means responsive to said last named signal to cause a special disposition of such overweight or underweight content upon discharge thereof.

36. In a weighing machine characterized by a series of counterpoised material receiving and weighing units traveling an endless path and discharging the content thereof after weighing it, a device to supply to each of said units during travel a charge of material to be weighed, said device comprising a plurality of vibratory supply receptacles arranged in sequence to discharge one onto another, including a pair of counterpoised supply receptacles each having means operatively connecting it to a preceding vibratory supply receptacle to adjust the vibratory rate of the latter in response to the weight of material on the counterpoised receptacle in question, said receptacle in question having means similarly responsive to the weight of material on a counterpoised supply receptacle following it to adjust the range of its own vibratory rates concurrently with the adjustment of its rate, the final vibratory supply receptacle of the series having means responsive to signal from a counterpoised material receiving and weighing unit to adjust the rate of vibration of said final supply receptacle in accordance with the weight of the content of said unit, said signal being originated during weighing of said content; and means operative in response to the weight of the content of each unit, and following completion of the weighing of said content and prior to discharge thereof, to initiate a signal indicative of an overweight or underweight content, said weighing machine having means responsive to said last named signal to cause a special disposition of such overweight or underweight content upon discharge thereof.

37. A material weighing machine adapted to be operated in conjunction with a carton set-up machine supplying set-up cartons thereto, said weighing machine having means to operatively connect the same to said set-up machine for such operation, said weighing machine comprising a plurality of counterpoised material receiving, weighing and discharging units traveling in an endless path and each weighing a charge of varying weight during travel prior to termination of weighing and discharge of the weighted content of the unit, each unit having means operative after termination of weighing and prior to said discharge to detect an overweight or underweight content and to initiate a signal indicative thereof, and means transmitting said signal to said first named means to cause said carton set-up machine to fail to supply a set-up carton to said weighing machine to receive the discharged overweight or underweight content in question.

38. A material weighing machine adapted to be operated in conjunction with a carton set-up machine supplying set-up cartons thereto, said weighing machine having means to operatively connect the same to said set-up machine for such operation, said weighing machine comprising a plurality of counterpoised material receiving, weighing and discharging units traveling in an endless path and each weighing a charge of varying weight during travel prior to termination of weighing and discharge of the weighed content of the unit, each unit having means operative after termination of weighing and prior to said discharge to detect an overweight or underweight content and to initiate a signal indicative thereof, and means transmitting said signal to said first named means to cause said carton set-up machine to fail to supply a set-up carton to said weighing machine to receive the discharged overweight or underweight content in question; and a conveyor receiving said discharged overweight or underweight content.

39. A material weighing machine adapted to be operated in conjunction with a carton set-up machine supplying set-up cartons thereto, said weighing machine having means to operatively connect the same to said set-up machine for such operation, said weighing machine comprising a plurality of counterpoised material receiving, weighing and discharging units traveling in an endless path and each weighing a charge of varying weight during travel prior to termination of weighing and discharge of the weighed content of the unit, each unit having means operative after termination of weighing and prior to said discharge to detect an overweight or underweight content and to initiate a signal indicative thereof, and means transmitting said signal to said first named means to cause said carton set-up machine to fail to supply a set-up carton to said weighing machine to receive the discharged overweight or underweight content in question; and a conveyor receiving said discharged overweight or underweight content, said weighing machine having means supplying said material receiving, weighing and discharging units with initial charges to be weighed, said conveyor returning said overweight and underweight content to said supply means.

40. A material weighing machine comprising a series of traveling vibratory, material receiving units each counterpoised to weigh a charge of material during travel and while under vibration so as to feed-off excess material therefrom until a desired weight of content is reached, means supplying to said units initial charges of material to be weighed, and conveyor means receiving the material fed off from said units and returning the same to said supply means.

41. A material weighing machine comprising a series of traveling vibratory, material receiving units each counterpoised to weigh a charge of material during travel and while under vibration so as to feed-off excess material therefrom until a desired weight of content is reached, means supplying to said units initial charges of material to be weighed, said means including successive vibratory troughs discharging material one onto another and ultimately to a material receiving unit, and conveyor means receiving the material fed off from said units and returning the same directly to a trough of said supply means.

42. Weighing apparatus comprising a series of material containing receptacles driven for travel in an endless path, means acting on each receptacle in its travel to alter the weight of its content to a desired value, counterpoise-balanced means supporting the receptacles and the content thereof in travel and operative on said first named means to terminate the weight altering action thereof when the desired weight in any given receptacle is reached in travel, means to empty said receptacles of the weighed content thereof to the extent that the latter is normally dischargeable, said counterpoise-balanced means including master weight means effective thereon to balance the desired weight alone of the receptacle content, means acting on said counterpoise-balanced means after said emptying of the receptacle content by said receptacle emptying means to render said master weight means ineffective, and means altering the tare of said counterpoise-balanced means to balance the weight of the receptacle plus residue of its content not discharged in emptying, including an adjustable, motor-actuated weight on said counterpoise-balanced means, and electrical contact means in circuit with the actuating motor of said last named weight to energize said motor and adjust said last named weight to compensate for the weight of such undischarged residue in response to operation of said contact means.

References Cited in the file of this patent

UNITED STATES PATENTS

| | | |
|---|---|---|
| 600,039 | Richards | Mar. 1, 1898 |
| 600,040 | Richards | Mar. 1, 1898 |
| 1,079,495 | Jefferies et al. | Nov. 25, 1913 |
| 1,262,256 | Redd | Apr. 9, 1918 |
| 2,076,617 | Cleaves | Apr. 13, 1937 |
| 2,675,120 | Autenrieth et al. | Apr. 13, 1954 |
| 2,701,703 | Evers | Feb. 8, 1955 |
| 2,901,209 | Brady et al. | Jan. 30, 1956 |
| 2,904,304 | Zwoyer et al. | Sept. 15, 1959 |
| 3,020,966 | Olofsson et al. | Feb. 13, 1962 |

OTHER REFERENCES

"Terms and Definitions for the Weighing Industry" (Scale Manufacturers Association, Inc.), Washington, D.C., 1958 (page 84 relied upon).